US012574179B2

(12) United States Patent
Sridharan et al.

(10) Patent No.: US 12,574,179 B2
(45) Date of Patent: Mar. 10, 2026

(54) ZERO-DELAY GAP PERIOD SOUNDING REFERENCE SIGNAL TRANSMISSIONS WITH ANTENNA SWITCHING

(71) Applicant: QUALCOMM Incorporated, San Diego, CA (US)

(72) Inventors: Gokul Sridharan, Sunnyvale, CA (US); Muhammad Sayed Khairy Abdelghaffar, San Jose, CA (US); Amin Jalali, Irvine, CA (US); Yu Zhang, San Diego, CA (US); Yi Huang, San Diego, CA (US); Yeliz Tokgoz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 496 days.

(21) Appl. No.: 18/069,964

(22) Filed: Dec. 21, 2022

(65) Prior Publication Data

US 2024/0214148 A1     Jun. 27, 2024

(51) Int. Cl.
*H04L 5/00*          (2006.01)

(52) U.S. Cl.
CPC .......... *H04L 5/0051* (2013.01); *H04L 5/0092* (2013.01)

(58) Field of Classification Search
None
See application file for complete search history.

(56) References Cited

U.S. PATENT DOCUMENTS

| | | | |
|---|---|---|---|
| 2018/0367986 A1* | 12/2018 | Sundararajan | ........ H04W 72/12 |
| 2019/0222296 A1* | 7/2019 | Khandani | .............. H04B 7/086 |
| 2022/0224444 A1 | 7/2022 | Go et al. | |
| 2022/0353042 A1 | 11/2022 | Gao et al. | |
| 2023/0171756 A1* | 6/2023 | Abdelghaffar | .... H04W 72/0446 |
| | | | 370/336 |
| 2024/0187058 A1* | 6/2024 | Haghighat | .......... H04L 25/0226 |
| 2024/0195568 A1* | 6/2024 | Liu | ...................... H04B 7/0691 |

OTHER PUBLICATIONS

International Search Report and Written Opinion—PCT/US2023/084531—ISA/EPO—Jun. 4, 2024.
Partial International Search Report—PCT/US2023/084531—ISA/EPO—Apr. 12, 2024.

* cited by examiner

*Primary Examiner* — Steve R Young
(74) *Attorney, Agent, or Firm* — Holland & Hart LLP

(57) ABSTRACT

Methods, systems, and devices for wireless communications are described. A user equipment (UE) may transmit a first message indicating a UE capability to perform antenna-switching using a zero-delay gap period between successive transmissions of a sounding reference signal (SRS) using different antennas of the UE. The UE may receive a second message indicating a set of SRS parameters for the UE, the set of SRS parameters based at least in part on the UE capability. The UE may perform the successive transmissions of the SRS using the zero-delay gap period between the successive transmissions of the SRS according to the set of SRS parameters.

30 Claims, 19 Drawing Sheets

215

Serving Cell

220 — UE Capability

SRS Parameters

SRS Transmissions

210

205

225

200

Mode 0

605             610

Mode 1

605    610

600

Communications Manager

UE Capability Manager

825

Receiver

810

SRS Configuration Manager

830

Transmitter

815

SRS Transmission Manager

835

820

805

800

130

105

115

Network
Entity

Transceiver

1410

Antenna

1415

Communications
Manager

1420

Memory

Code

1430

1425

1440

Processor

1435

1405

1400

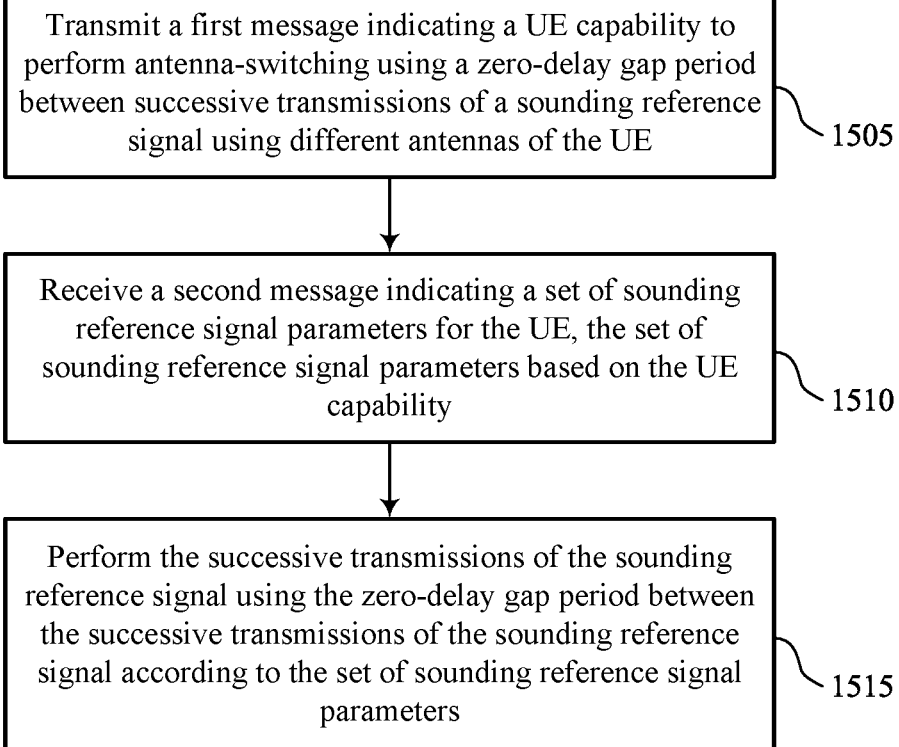

Transmit a first message indicating a UE capability to perform antenna-switching using a zero-delay gap period between successive transmissions of a sounding reference signal using different antennas of the UE

1505

Receive a second message indicating a set of sounding reference signal parameters for the UE, the set of sounding reference signal parameters based on the UE capability

1510

Perform the successive transmissions of the sounding reference signal using the zero-delay gap period between the successive transmissions of the sounding reference signal according to the set of sounding reference signal parameters

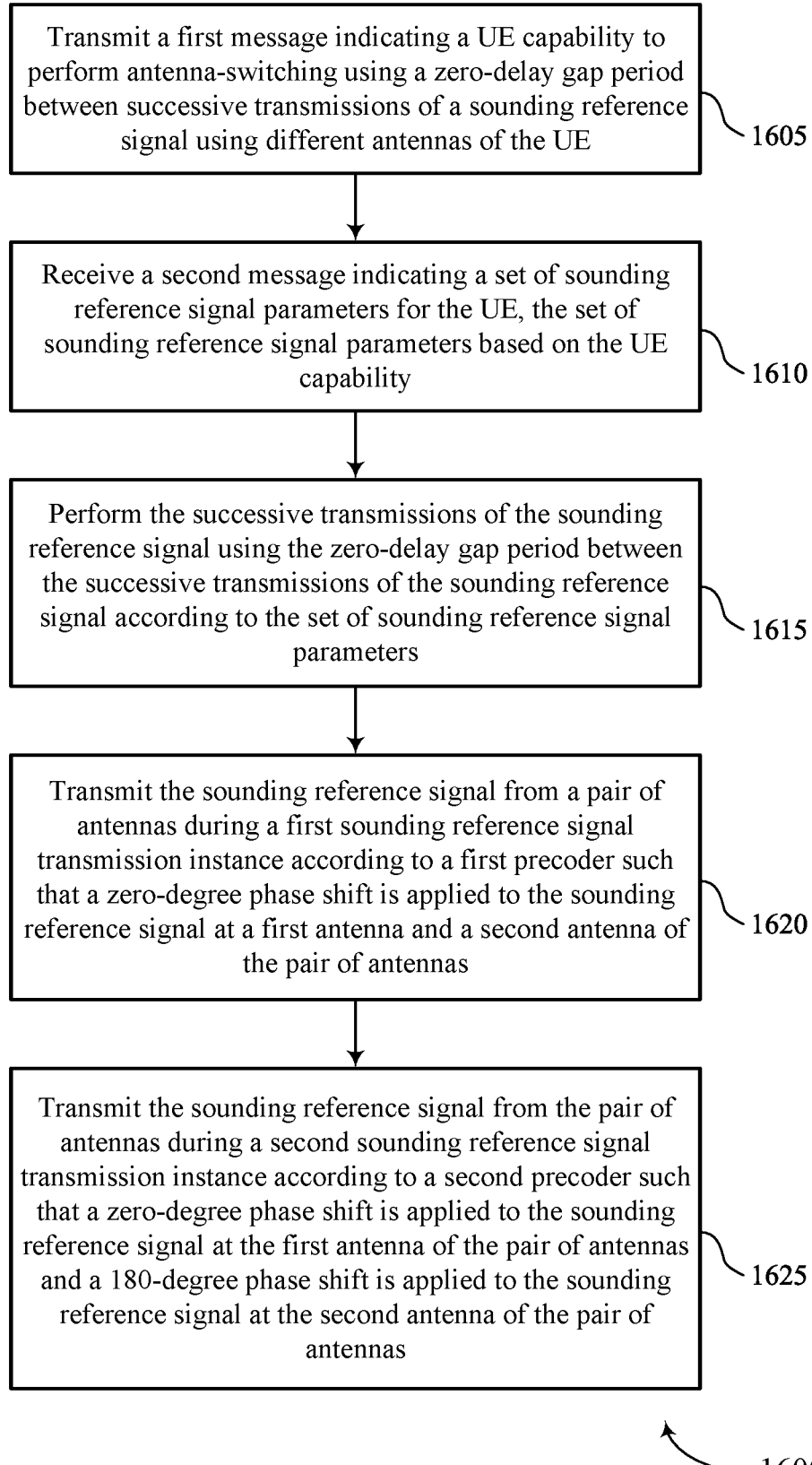

Transmit a first message indicating a UE capability to perform antenna-switching using a zero-delay gap period between successive transmissions of a sounding reference signal using different antennas of the UE ⟩ 1605

Receive a second message indicating a set of sounding reference signal parameters for the UE, the set of sounding reference signal parameters based on the UE capability ⟩ 1610

Perform the successive transmissions of the sounding reference signal using the zero-delay gap period between the successive transmissions of the sounding reference signal according to the set of sounding reference signal parameters ⟩ 1615

Transmit the sounding reference signal from a pair of antennas during a first sounding reference signal transmission instance according to a first precoder such that a zero-degree phase shift is applied to the sounding reference signal at a first antenna and a second antenna of the pair of antennas ⟩ 1620

Transmit the sounding reference signal from the pair of antennas during a second sounding reference signal transmission instance according to a second precoder such that a zero-degree phase shift is applied to the sounding reference signal at the first antenna of the pair of antennas and a 180-degree phase shift is applied to the sounding reference signal at the second antenna of the pair of antennas ⟩ 1625

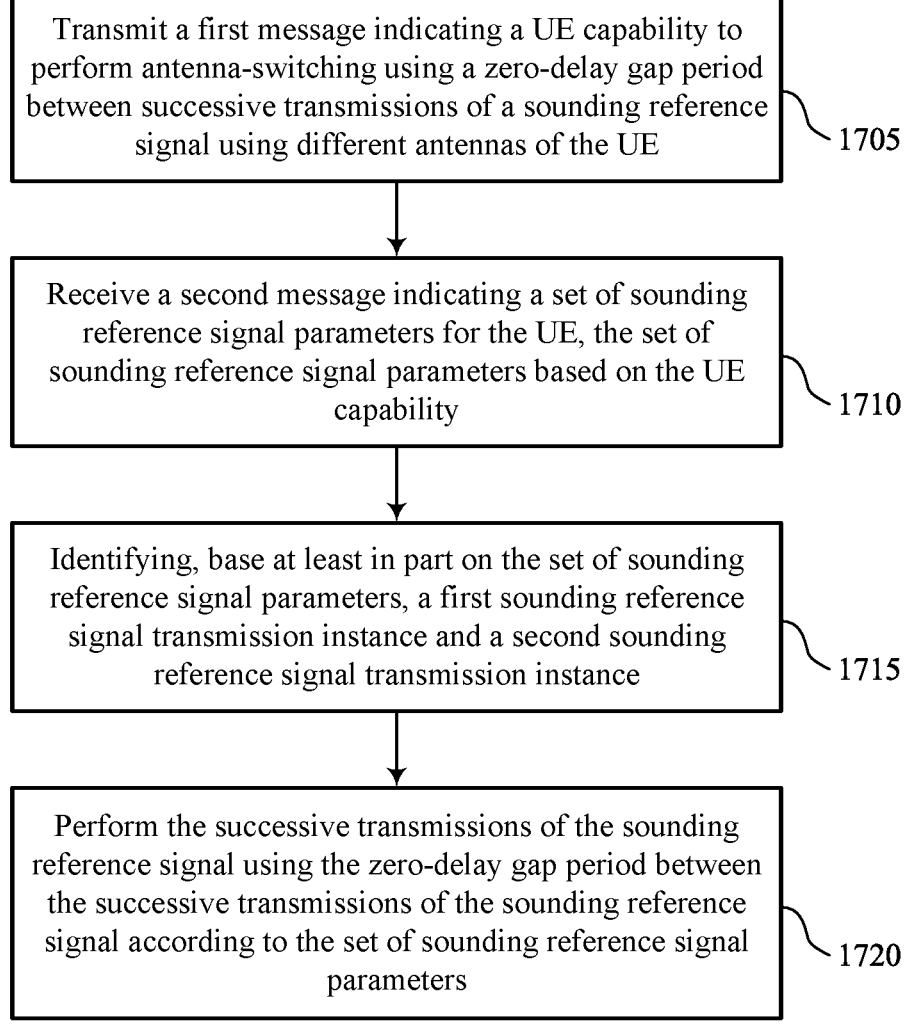

Transmit a first message indicating a UE capability to perform antenna-switching using a zero-delay gap period between successive transmissions of a sounding reference signal using different antennas of the UE

1705

Receive a second message indicating a set of sounding reference signal parameters for the UE, the set of sounding reference signal parameters based on the UE capability

1710

Identifying, base at least in part on the set of sounding reference signal parameters, a first sounding reference signal transmission instance and a second sounding reference signal transmission instance

1715

Perform the successive transmissions of the sounding reference signal using the zero-delay gap period between the successive transmissions of the sounding reference signal according to the set of sounding reference signal parameters

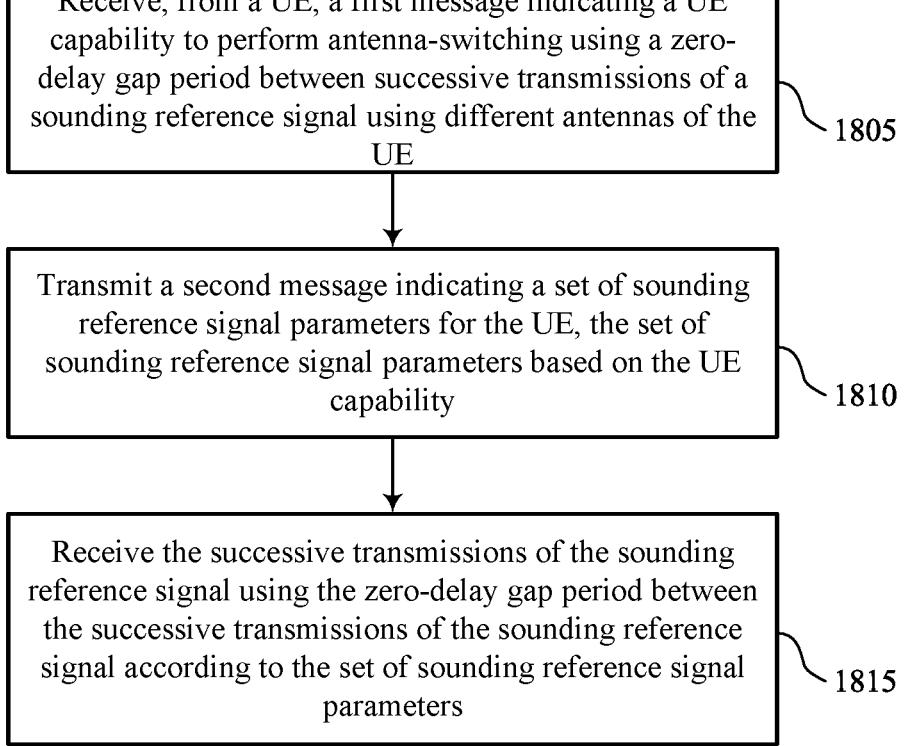

Receive, from a UE, a first message indicating a UE capability to perform antenna-switching using a zero-delay gap period between successive transmissions of a sounding reference signal using different antennas of the UE

1805

Transmit a second message indicating a set of sounding reference signal parameters for the UE, the set of sounding reference signal parameters based on the UE capability

1810

Receive the successive transmissions of the sounding reference signal using the zero-delay gap period between the successive transmissions of the sounding reference signal according to the set of sounding reference signal parameters

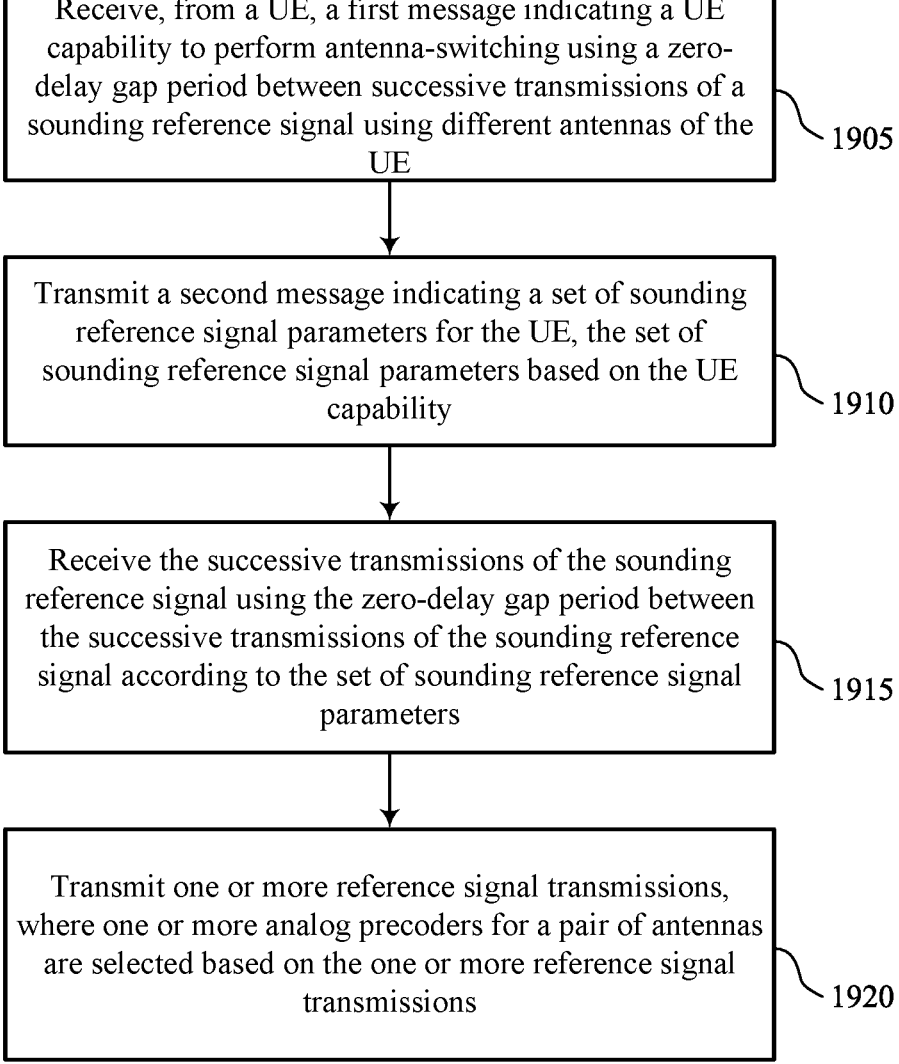

Receive, from a UE, a first message indicating a UE capability to perform antenna-switching using a zero-delay gap period between successive transmissions of a sounding reference signal using different antennas of the UE

1905

Transmit a second message indicating a set of sounding reference signal parameters for the UE, the set of sounding reference signal parameters based on the UE capability

1910

Receive the successive transmissions of the sounding reference signal using the zero-delay gap period between the successive transmissions of the sounding reference signal according to the set of sounding reference signal parameters

1915

Transmit one or more reference signal transmissions, where one or more analog precoders for a pair of antennas are selected based on the one or more reference signal transmissions

ZERO-DELAY GAP PERIOD SOUNDING REFERENCE SIGNAL TRANSMISSIONS WITH ANTENNA SWITCHING

FIELD OF TECHNOLOGY

The following relates to wireless communication, including zero-delay gap period sounding reference signal transmissions with antenna switching.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communications for communication devices, which may be known as user equipment (UE).

SUMMARY

The described techniques relate to improved methods, systems, devices, and apparatuses that support antenna switching between successive sounding reference signal (SRS) transmissions using low- or zero-delay gap periods between the successive SRS transmissions. In some aspects, a UE may support this rapid antenna switching using a hardware architecture in which a transmit chain is coupled to multiple antennas via a splitter and a set of phase shifters. The splitter may couple an output of the transmit chain to each antennas via a separate phase shifter. In other words, a separate phase shifter may couple each antenna to the transmit chain, and the splitter may output the transmit chain signal to each phase-shifter associated with each antenna. The UE may transmit or otherwise convey a UE capability indicating support for such zero-delay gap period when antenna switching is configured for the SRS transmissions. Accordingly, the UE may receive an indication of a set of SRS parameters based on the UE capability (e.g., when the SRS parameters include antenna switching for successive SRS transmissions). Thus, the UE may perform the successive SRS transmissions using a low-delay or zero-delay gap period (e.g., according to the set of SRS parameters). In some examples, this may include the UE sounding both antennas using a zero-degree phase shift (e.g., using the phase-shifters) during a first SRS transmission instance and then sounding, during the second SRS transmission instance using a zero-degree phase shift from one antenna and a 180-degree phase shift from the other antenna.

A method for wireless communication at a UE is described. The method may include transmitting a first message indicating a UE capability to perform antenna-switching using a zero-delay gap period between successive transmissions of a SRS using different antennas of the UE, receiving a second message indicating a set of SRS parameters for the UE, the set of SRS parameters based on the UE capability, and performing the successive transmissions of the SRS using the zero-delay gap period between the successive transmissions of the SRS according to the set of SRS parameters.

An apparatus for wireless communication at a UE is described. The apparatus may include a processor, memory in electronic communication with the processor, and instructions stored in the memory. The instructions may be executable by the processor to transmit a first message indicating a UE capability to perform antenna-switching using a zero-delay gap period between successive transmissions of a SRS using different antennas of the UE, receive a second message indicating a set of SRS parameters for the UE, the set of SRS parameters based on the UE capability, and perform the successive transmissions of the SRS using the zero-delay gap period between the successive transmissions of the SRS according to the set of SRS parameters.

Another apparatus for wireless communication at a UE is described. The apparatus may include means for transmitting a first message indicating a UE capability to perform antenna-switching using a zero-delay gap period between successive transmissions of a SRS using different antennas of the UE, means for receiving a second message indicating a set of SRS parameters for the UE, the set of SRS parameters based on the UE capability, and means for performing the successive transmissions of the SRS using the zero-delay gap period between the successive transmissions of the SRS according to the set of SRS parameters.

A non-transitory computer-readable medium storing code for wireless communication at a UE is described. The code may include instructions executable by a processor to transmit a first message indicating a UE capability to perform antenna-switching using a zero-delay gap period between successive transmissions of a SRS using different antennas of the UE, receive a second message indicating a set of SRS parameters for the UE, the set of SRS parameters based on the UE capability, and perform the successive transmissions of the SRS using the zero-delay gap period between the successive transmissions of the SRS according to the set of SRS parameters.

In some examples of the method, apparatuses, and non-transitory computer-readable medium described herein, performing the successive transmissions of the SRS using the zero-delay gap period may include operations, features, means, or instructions for transmitting the SRS from a pair of antennas during a first SRS transmission instance according to a first precoder such that a zero-degree phase shift may be applied to the SRS at a first antenna and a second antenna of the pair of antennas and transmitting the SRS from the pair of antennas during a second SRS transmission instance according to a second precoder such that a zero-degree phase shift may be applied to the SRS at the first antenna of the pair of antennas and a 180-degree phase shift may be applied to the SRS at the second antenna of the pair of antennas.

In some examples of the method, apparatuses, and non-transitory computer-readable medium described herein, performing the successive transmissions of the SRS using the zero-delay gap period may include operations, features, means, or instructions for outputting the SRS from a splitter to a first phase-shifter associated with the first antenna and a second phase-shifter associated with the second antenna, where the first phase-shifter applies the first precoder during the first SRS transmission instance and the second phase-shifter applies the second precoder during the second SRS transmission instance.

Some examples of the method, apparatuses, and non-transitory computer-readable medium described herein may further include operations, features, means, or instructions for applying a first gain for a first power amplifier of the first antenna performing the SRS transmission during the first SRS transmission instance and a second gain for a second power amplifier of the second antenna performing the SRS transmission during the second SRS transmission instance.

In some examples of the method, apparatuses, and non-transitory computer-readable medium described herein, the first antenna and the second antenna of the pair of antennas include a co-polarized antenna pair or a cross-polarized antenna pair.

In some examples of the method, apparatuses, and non-transitory computer-readable medium described herein, identifying, based on the set of SRS parameters, a precoding matrix including the first precoder and the second precoder.

In some examples of the method, apparatuses, and non-transitory computer-readable medium described herein, identifying, based on the set of SRS parameters, a first SRS transmission instance and a second SRS transmission instance.

In some examples of the method, apparatuses, and non-transitory computer-readable medium described herein, the first SRS transmission instance and the second SRS transmission instance include sub-symbol level time periods or symbol level time periods.

Some examples of the method, apparatuses, and non-transitory computer-readable medium described herein may further include operations, features, means, or instructions for applying a modified subcarrier spacing for the successive transmissions of SRS.

Some examples of the method, apparatuses, and non-transitory computer-readable medium described herein may further include operations, features, means, or instructions for receiving one or more reference signal transmissions and selecting one or more analog precoders for a pair of antennas based on one or more digital precoders for the pair of antennas and the one or more reference signal transmissions.

Some examples of the method, apparatuses, and non-transitory computer-readable medium described herein may further include operations, features, means, or instructions for receiving an indication of one or more analog precoders for a pair of antennas based on the successive transmissions of the SRS.

A method for wireless communication at a network entity is described. The method may include receiving, from a UE, a first message indicating a UE capability to perform antenna-switching using a zero-delay gap period between successive transmissions of a SRS using different antennas of the UE, transmitting a second message indicating a set of SRS parameters for the UE, the set of SRS parameters based on the UE capability, and receiving the successive transmissions of the SRS using the zero-delay gap period between the successive transmissions of the SRS according to the set of SRS parameters.

An apparatus for wireless communication at a network entity is described. The apparatus may include a processor, memory in electronic communication with the processor, and instructions stored in the memory. The instructions may be executable by the processor to receive, from a UE, a first message indicating a UE capability to perform antenna-switching using a zero-delay gap period between successive transmissions of a SRS using different antennas of the UE, transmit a second message indicating a set of SRS parameters for the UE, the set of SRS parameters based on the UE capability, and receive the successive transmissions of the SRS using the zero-delay gap period between the successive transmissions of the SRS according to the set of SRS parameters.

Another apparatus for wireless communication at a network entity is described. The apparatus may include means for receiving, from a UE, a first message indicating a UE capability to perform antenna-switching using a zero-delay gap period between successive transmissions of a SRS using different antennas of the UE, means for transmitting a second message indicating a set of SRS parameters for the UE, the set of SRS parameters based on the UE capability, and means for receiving the successive transmissions of the SRS using the zero-delay gap period between the successive transmissions of the SRS according to the set of SRS parameters.

A non-transitory computer-readable medium storing code for wireless communication at a network entity is described. The code may include instructions executable by a processor to receive, from a UE, a first message indicating a UE capability to perform antenna-switching using a zero-delay gap period between successive transmissions of a SRS using different antennas of the UE, transmit a second message indicating a set of SRS parameters for the UE, the set of SRS parameters based on the UE capability, and receive the successive transmissions of the SRS using the zero-delay gap period between the successive transmissions of the SRS according to the set of SRS parameters.

In some examples of the method, apparatuses, and non-transitory computer-readable medium described herein, receiving the successive transmissions of the SRS using the zero-delay gap period may include operations, features, means, or instructions for receiving the SRS from a pair of antennas of the UE during a first SRS transmission instance according to a first precoder such that a zero-degree phase shift may be applied to the SRS at a first antenna and a second antenna of the pair of antennas and receiving the SRS from the pair of antennas of the UE during a second SRS transmission instance according to a second precoder such that a zero-degree phase shift may be applied to the SRS at the first antenna of the pair of antennas and a 180-degree phase shift may be applied to the SRS at the second antenna of the pair of antennas.

Some examples of the method, apparatuses, and non-transitory computer-readable medium described herein may further include operations, features, means, or instructions for determining one or more analog precoders for a pair of antennas based on the SRS received during the first SRS transmission instance and during the second SRS transmission instance and transmitting an indication of the one or more analog precoders for the pair of antennas to the UE.

Some examples of the method, apparatuses, and non-transitory computer-readable medium described herein may further include operations, features, means, or instructions for determining a precoding matrix for the successive transmissions of the SRS, where the set of SRS parameters indicates a precoding matrix including the first precoder and the second precoder.

In some examples of the method, apparatuses, and non-transitory computer-readable medium described herein, the set of SRS parameters indicates a first SRS transmission instance and a second SRS transmission instance.

In some examples of the method, apparatuses, and non-transitory computer-readable medium described herein, the first SRS transmission instance and the second SRS transmission instance include sub-symbol level time periods or symbol level time periods.

In some examples of the method, apparatuses, and non-transitory computer-readable medium described herein, a modified subcarrier spacing may be applied for the successive transmissions of SRS.

Some examples of the method, apparatuses, and non-transitory computer-readable medium described herein may further include operations, features, means, or instructions for transmitting one or more reference signal transmissions, where one or more analog precoders for a pair of antennas may be selected based on one or more digital precoders for the pair of antennas and the one or more reference signal transmissions.

6

Figure 1:
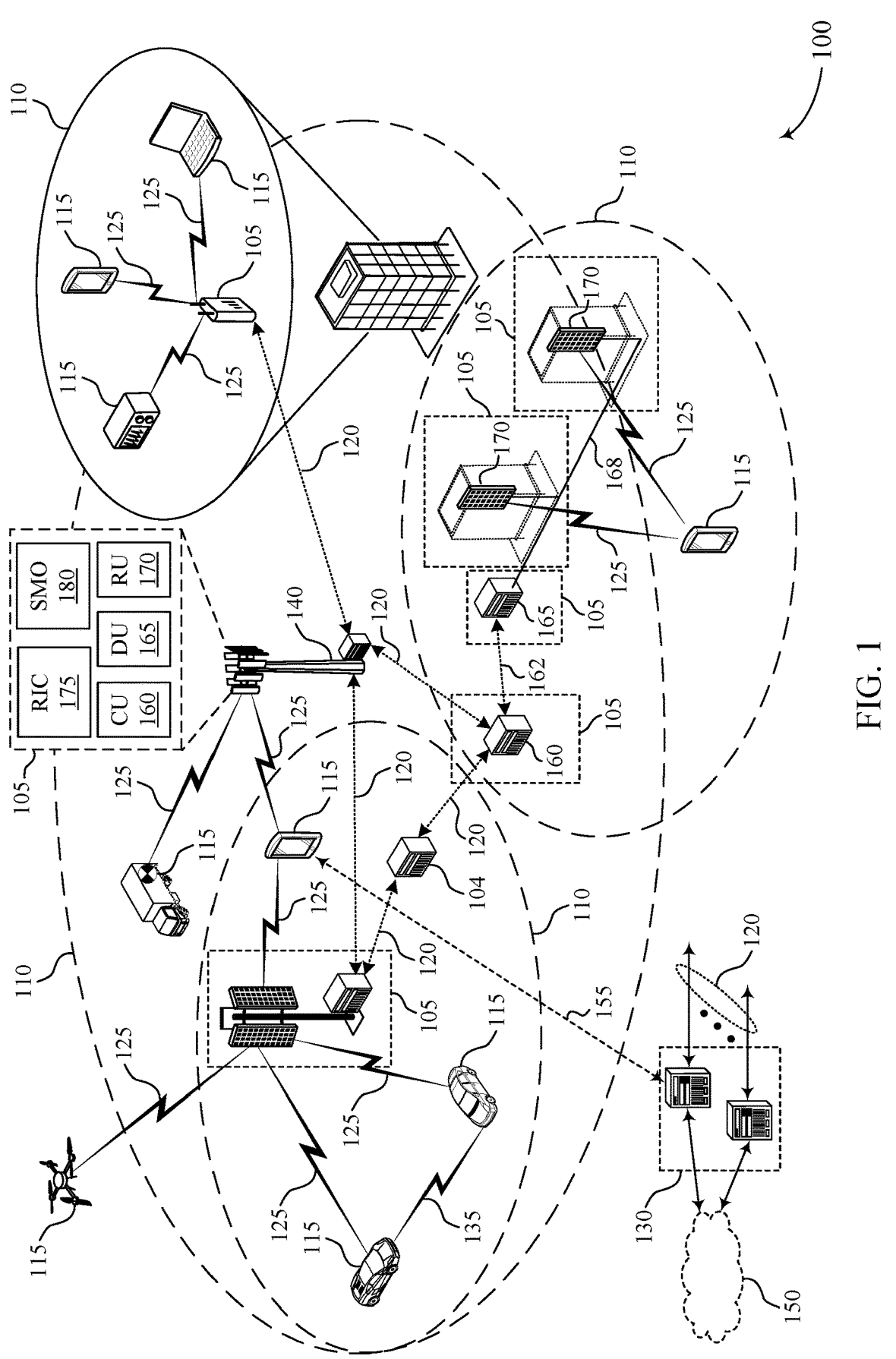
FIG. 1 illustrates an example of a wireless communications system that supports zero-delay gap period sounding reference signal (SRS) transmissions with antenna switching in accordance with one or more aspects of the present disclosure.

FIGS. 15 through 19 illustrate flowcharts showing methods that support zero-delay gap period SRS transmissions with antenna switching in accordance with one or more aspects of the present disclosure.

DETAILED DESCRIPTION

Some user equipment (UEs) have asymmetry in uplink and downlink hardware. For example, a UE may be equipped with more receive chains than transmit chains (e.g., 2T4R, meaning two transmit chains and four receive chains). Such a UE may have a separate antenna for each receive chain (e.g., 4 antennas to accommodate the four receive chains in the 2T4R example) such that each receive chain is connected or otherwise coupled to an antenna. Each receive chain may be connected to the antenna via a transmit/receive (T/R) switch. In some UEs, each transmit chain may be connected or otherwise coupled to at least one of two antennas of the UE via an analog switch (e.g., in addition to the T/R switch). However, the use of analog switches between the transmit chain and the antennas may negatively affect the performance of the UE. For example, analog switching generally introduces a drop in transmit power. Moreover, analog switching is relatively slow, and involves scheduling delay gaps for the UE between successive transmissions using the same transmit chain but different antennas (e.g., due to a transient noise period resulting from analog antenna switching). For example, a gap period may be configured between successive sounding reference signal (SRS) transmissions associated with different antennas. The gap periods introduce delays into channel sounding procedures, as the UE must wait for at least the gap period to allow the transmit chain/antenna coupling to settle before transmitting the next instance.

Accordingly, aspects of the described techniques provide for antenna switching between successive sounding reference signal (SRS) transmissions using low- or zero-delay gap periods between the successive SRS transmissions. In some aspects, a UE may support this rapid antenna switching using a hardware architecture in which a transmit chain is coupled to multiple antennas via a splitter and a set of phase shifters. The splitter may couple an output of the transmit chain to each antennas via a separate phase shifter. In other words, a separate phase shifter may couple each antenna to the transmit chain, and the splitter may output the transmit chain signal to each phase-shifter associated with each antenna. The UE may transmit or otherwise convey a UE capability indicating support for such zero-delay gap period when antenna switching is configured for the SRS transmissions. Accordingly, the UE may receive an indication of a set of SRS parameters based on the UE capability (e.g., when the SRS parameters include antenna switching for successive SRS transmissions). Thus, the UE may perform the successive SRS transmissions using a low-delay or zero-delay gap period (e.g., according to the set of SRS parameters). In some examples, this may include the UE sounding both antennas using a zero-degree phase shift (e.g., using the phase-shifters) during a first SRS transmission instance and then sounding, during the second SRS transmission instance using a zero-degree phase shift from one antenna and a 180-degree phase shift from the other antenna.

Aspects of the disclosure are initially described in the context of wireless communications systems. Aspects of the disclosure are further illustrated by and described with reference to apparatus diagrams, system diagrams, and flowcharts that relate to zero-delay gap period SRS transmissions with antenna switching.

FIG. 1 illustrates an example of a wireless communications system 100 that supports zero-delay gap period SRS transmissions with antenna switching in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both.

For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support zero-delay gap period SRS transmissions with antenna switching as described herein. For example, some operations described as being performed by a UE 115 or a network entity 105 (e.g., a base station 140)

may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrow band IoT (NB-IOT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrow band communications), or a combination of these techniques. For example, some UEs 115 may be configured for operation using a narrow band protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A UE 115 may transmit a first message indicating a UE capability to perform antenna-switching using a zero-delay gap period between successive transmissions of a SRS using different antennas of the UE 115. The UE 115 may receive a second message indicating a set of SRS parameters for the UE 115, the set of SRS parameters based at least in part on the UE capability. The UE 115 may perform the successive transmissions of the SRS using the zero-delay gap period between the successive transmissions of the SRS according to the set of SRS parameters.

A network entity 105 may receive, from a UE 115, a first message indicating a UE capability to perform antenna-switching using a zero-delay gap period between successive transmissions of a SRS using different antennas of the UE 115. The network entity 105 may transmit a second message indicating a set of SRS parameters for the UE 115, the set of SRS parameters based at least in part on the UE capability. The network entity 105 may receive the successive transmissions of the SRS using the zero-delay gap period between the successive transmissions of the SRS according to the set of SRS parameters.

Figure 2:
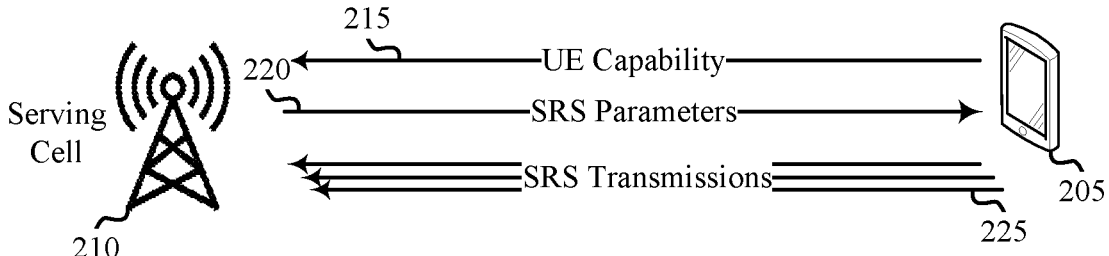
FIG. 2 illustrates an example of a wireless communications system that supports zero-delay gap period SRS transmissions with antenna switching in accordance with one or more aspects of the present disclosure.

FIG. 2 illustrates an example of a wireless communications system 200 that supports zero-delay gap period SRS transmissions with antenna switching in accordance with one or more aspects of the present disclosure. Wireless communications system 200 may implement aspects of wireless communications system 100. Wireless communications system 200 may include a UE 205 and a network entity 210, which may be examples of the corresponding devices described herein.

The UE 205 and the network entity 210 generally perform wireless communications over a wireless medium (e.g., a channel) using a variety of radio technologies. Further, the UE 205 may communicate with other UE and/or the network entity 210 may communicate with other network entities over the wireless medium. To support such wireless communications, various channel measurement and reporting techniques are utilized to determine the performance of the current channel (e.g., in terms of interference levels, throughput, network load, or other parameters indicative of the channel performance). Such techniques generally include one device (e.g., the UE 205 "sounding" the channel, such as by transmitting a signal having known transmission properties, where the receiving device (e.g., the network entity 210, in this example) measures the signal to determine properties of the received signal. Examples of such sounding techniques may include, but are not limited to, a channel state information (CSI) technique where the network entity 210 transmits CSI-reference signal(s) (CSI-RS)(s) to the UE 205 for measurement, to SRS techniques where the UE 205 transmits SRS to the network entity 210 for measurement, or similar channel measurement and reporting techniques. The signal(s) being measured during such channel measurement and reporting techniques may include, but are not limited to, CSI-RS transmissions, synchronization signal block (SSB) transmissions, SRS transmissions, or other synchronization, reference, or tracking signal transmissions.

The receiving entity (e.g., the network entity 210, continuing with the above example) may adjust various of its transmission and/or reception properties based on the results of the channel measurements. The receiving device may indicate a result (or information based on the result) of the channel measurements back to the transmitting device (e.g., the UE 205 in this example), which may also adjust various of its transmission and/or reception properties. As each UE is generally configured with at least one, and often more than one, transmit chain used for performing wireless transmissions and at least one receive chain used for receiving wireless transmissions.

The UE 205 may generally have asymmetry in its uplink and downlink hardware. For example, the UE 205 may be equipped with more receive chains than transmit chains (e.g., 2T4R), even though the UE 205 is generally equipped with a separate antenna for each receive chain (e.g., 4 antennas to accommodate the four receive chains in the 2T4R example) such that each receive chain is connected or otherwise coupled to an antenna.

In some examples, the UE 205 may support antenna switching between successive SRS transmissions with a zero-delay gap period between the SRS transmissions. For example, the UE 205 may be configured with or otherwise support antenna switching using a zero-delay gap period. That is, the zero-delay gap period may refer to the absence of a gap period (e.g., guard period) between successive transmissions, or the use of a gap period between successive transmissions is effectively or constructively zero because the switching time is so low that successive transmissions can be processed on different antennas without scheduling a gap period to accommodate the switching. In certain cases, the zero-delay gap period may refer to a gap period that is below a threshold time period (e.g., relative to a symbol duration), such as is below $\frac{1}{64}$, $\frac{1}{32}$, $\frac{1}{16}$, $\frac{1}{8}$, $\frac{1}{4}$, or some other portion, of the symbol duration in the time domain. For example, the zero-delay gap period may correspond to a guard period where the value of Y is set to zero or below the threshold or to the guard period simply not being configured, indicated, or otherwise provided to the UE 205.

In the channel sounding example, the UE 205 may support successive SRS transmissions using different antenna of the UE 205 (e.g., antenna switching), where the gap period (e.g., guard period) has a zero-delay between the successive SRS transmissions. That is, the UE 205 may support successive SRS transmissions without an intervening gap period being observed by the UE 205.

For example, at 215 the UE 205 may transmit or otherwise convey a UE capability indicating support for such zero-delay gap period when antenna switching is configured for the SRS transmissions. The UE capability may be transmitted or otherwise provided in UE capability signaling and/or in UE assistance information signaling. The UE capability signaling may include one or more bits, fields, or values set to convey the indication that the UE 205 supports performing successive transmissions with the zero-delay gap period when antenna switching is used for the successive transmissions.

At 220, the UE 205 may receive an indication of a set of SRS parameters based on the UE capability (e.g., when the SRS parameters include antenna switching for successive SRS transmissions). For example, the UE 205 may receive or otherwise obtain (e.g., from the network entity 210) a set of parameters to be used for SRS transmissions by the UE 205 to the network entity 210. The parameters may indicate or otherwise identify time resources, frequency resources, spatial, resources, or code resources to be used for the SRS transmissions. The parameters may indicate or otherwise identify other transmission properties for the SRS transmissions, such as transit power, antenna-to-port mapping information, or other parameters related to SRS transmissions.

In some aspects, the set of SRS parameters may be based on the UE capability reporting. For example, the network entity 210 may select the parameters for the set of SRS parameters based on the capabilities of the UE 205 as reported in the UE capability. For example, the set of SRS parameters may be based on the UE 205 indicating support for performing antenna switching using the zero-delay gap period between success transmissions. The set of SRS parameters may include one or more bits, fields, or values indicating that successive SRS transmissions are to be performed by the UE 205 using antenna switching with the zero-delay gap period. The set of SRS parameters may be based on further information indicated in the UE capability reporting.

Thus, at 225 the UE 205 may perform the successive SRS transmissions using the zero-delay gap period (e.g., according to the set of SRS parameters). In some examples, this may include the UE sounding both antennas using a zero-degree phase shift (e.g., using phase-shifters) during a first SRS transmission instance and then sounding, during the second SRS transmission instance, both antennas using the zero-degree phase shift from one antenna and using a 180-degree phase shift from the other antenna. In some examples, this may include the UE sounding one antenna of a first pair of antennas during a first SRS transmission instance using a zero-degree phase shift, sounding one antenna of a second pair of antennas during the first or a second SRS transmission instance using the zero-degree phase shift, sounding a second antenna of the first antenna pair during the second or a third SRS transmission instance using the zero-degree phase shift, and sounding a second antenna of the second antenna pair during the third or a fourth SRS transmission instance using a 180-degree phase shift.

In some examples, the successive SRS transmissions may occur over separate symbols or at the sub-symbol level (e.g., multiple SRS transmissions within a symbol using the zero-delay gap period, such as using a higher subcarrier spacing (SCS) than the network). Accordingly, the network entity 210 may receive the successive SRS transmissions and perform channel measurement and reporting procedures. For example, the network entity 210 may modify various transmission and/or reception properties based on the results of the channel measurements performed on the SRS transmissions. The network entity 210 may transmit or otherwise provide reporting feedback to the UE 205 indicating information associated with the results of the channel measurements (e.g., the measurement results and/or information identified based on the measurement results). The UE 205 may use the indicated information to modify various transmission and/or reception properties. Thus, at 225 the UE 205 may perform the successive SRS transmissions using a sub-symbol level gap period (e.g., according to the set of SRS parameters). In some examples, this may include the UE sounding both antennas using a zero-degree phase shift (e.g., using phase-shifters) during a first SRS transmission instance and then sounding, during the second SRS transmission instance, both antennas using the zero-degree phase shift from one antenna and using a 180-degree phase shift from the other antenna.

Although the techniques discussed above generally focus on SRS sounding techniques, it is to be understood that such techniques may be applied to any network entity- and/or UE-based sounding technique. Further, such techniques are not limited to channel measurement and reporting for the channel between the UE 205 and the network entity 210. Instead, such techniques may also be utilized for channels associated with candidate cells adjacent to the UE 205, such as to support mobility operations of the UE 205.

Figure 3:
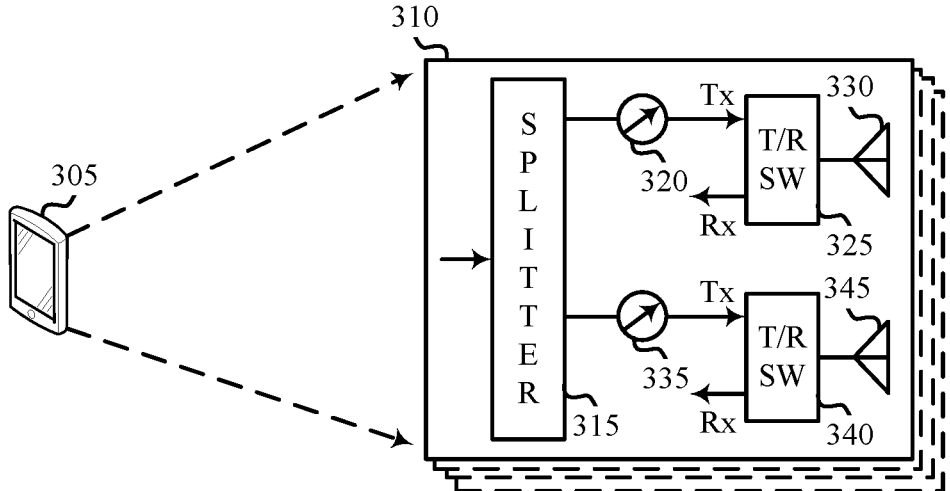
FIG. 3 illustrates an examples of a transmit/receive coupling design that supports zero-delay gap period SRS transmissions with antenna switching in accordance with one or more aspects of the present disclosure.

FIG. 3 illustrates examples of a transmit/receive coupling design 300 that supports zero-delay gap period SRS transmissions with antenna switching in accordance with one or more aspects of the present disclosure. The transmit/receive coupling design 300 may implement aspects of wireless communications systems 100 and/or 200. The transmit/receive coupling design 300 may include a UE 305, which may be an example of the corresponding device described herein. The transmit/receive coupling design 300 illustrates an example design that may support or otherwise enable support for antenna switching using a zero-delay gap period between successive transmissions.

As discussed above, the UE 305 may perform successive SRS transmissions using a zero-delay gap period between the successive SRS transmissions. For example, the UE 305 may transmit or otherwise provide a first message to a network entity. The first message may include UE capability reporting (e.g., a UE capability message and/or UE assistance information message) that indicates or otherwise identifies that the UE 305 supports performing the antenna switching using the zero-delay gap period between success SRS transmissions. In response, the network entity may transmit or otherwise provide a second message to the UE. The second message may indicate or otherwise identify a set of SRS parameters for the UE 305. The set of SRS parameters may identify or otherwise indicate the resources and/or transmission properties that the UE 305 is to use for the SRS transmissions. The set of SRS transmission properties may indicate that the UE 305 is to use antenna switching with the zero-delay gap period between successive SRS transmissions. The UE 305 may perform the successive SRS transmissions using the zero-delay gap period between SRS transmission instances and according to the set of SRS parameters.

For some UE, the UE may be configured with one or more of a analog switch-based transmit/receive design. The analog switch-based transmit/receive design may be considered an analog switch-based transmit/receive design in that the single digital transmit signal passes through an analog switch between a first antenna and a second antenna of a pair of antennas. For example, the transmit/receive design may include an analog switch that is coupled to a single digital transmit chain input (e.g., the data, signal, or information to be transmitted). The analog switch may be controlled by the UE (e.g., using at least one processor) to switch the transmit signal to a first antenna via a first transmit/receive switch or to a second antenna via a second transmit/receive switch. The first transmit/receive switch is coupled to the first antenna and may include one input (e.g., the transmit signal from the analog switch to be output to the first antenna) and one output (e.g., an output coupling the signal received from the antenna to the receive circuitry). The second transmit/receive switch is coupled to the second antenna and may include one input (e.g., the transmit signal from the analog switch to be output to the second antenna) and one output (e.g., an output coupling the signal received from the second antenna to the receive circuitry). The analog switch switches the single digital transmit chain signal to one of the two antennas (e.g., the first or second antenna, which may be considered a pair of antennas). The pair of antennas may be mapped to individual transmit/receive ports.

Turning next to the transmit/receive coupling design 300, the UE 305 may be configured with one or more of a transmit/receive design 310 that may be used to perform the successive SRS transmissions. The transmit/receive design 310 may be considered a splitter/phase-shift based transmit/receive design in that the single digital transmit signal passes through a splitter 315 and each signal passes through a phase-shifter before being coupled to the first antenna or second antenna of a pair of antennas. For example, the transmit/receive design 310 may include a splitter 315 that is coupled to a single digital transmit chain input. The splitter 315 may split the single digital transmit input signal and output the signal on both of two outputs. The first output may connect the transmit signal to an antenna 330 via a transmit/receive switch 325 and a phase shifter 320. The second output may connect the transmit signal to an antenna 345 via a transmit/receive switch 340 and a phase-shifter 335. Generally, each phase-shift may enable application of an analog precoding coefficient optimization (e.g., by controlling separate phase-shifts to the signal transmitted from each antenna in the antenna pair).

Performing successive SRS transmissions using the zero-delay gap period may include outputting the SRS signal from a splitter (e.g., the splitter 315) to a first phase-shifter (e.g., the phase shifter 320) associated with the first antenna (e.g., the antenna 330) and to a second phase-shifter (e.g., the phase-shifter 335) associated with a second antenna (e.g., the antenna 345). Generally, each phase-shifter may apply a precoder to the SRS signal (e.g., the single digital transmit signal) before transmission.

Accordingly, the digital transmit signal (e.g., the SRS signal in this example) may be coupled to both the antenna 330 and the antenna 345 by replacing the analog switch generally used to couple a transmit chain between a first antenna and a second antenna of a pair of antennas of the UE. Instead, the analog switch may be replaced with a splitter coupling the output of the transmit chain to both antennas via a phase-shifter (e.g., a phase-shifter for each antenna, where the splitter outputs the transmit chain signal to each phase-shifter associated with each antenna). The splitter 315 may be a 1:2 splitter, in some examples, the pair of antennas (e.g., the antenna 330 and the antenna 345 in this example) may be used to form two virtualized transmit ports. As each receive chain is coupled to a separate antenna, no virtualization is needed.

Replacing the analog switch with the splitter 315 and the phase-shifters of the transmit/receive design 310 eliminates the need for the transient time between successive SRS transmissions. This may improve successive SRS transmissions with antenna switching with the zero-delay gap period being successive transmissions. Further, replacing the analog switch with the splitter 315 and phase-shifters of the transmit/receive design 310 eliminates the signal loss associated with analog switching techniques.

Figure 4:
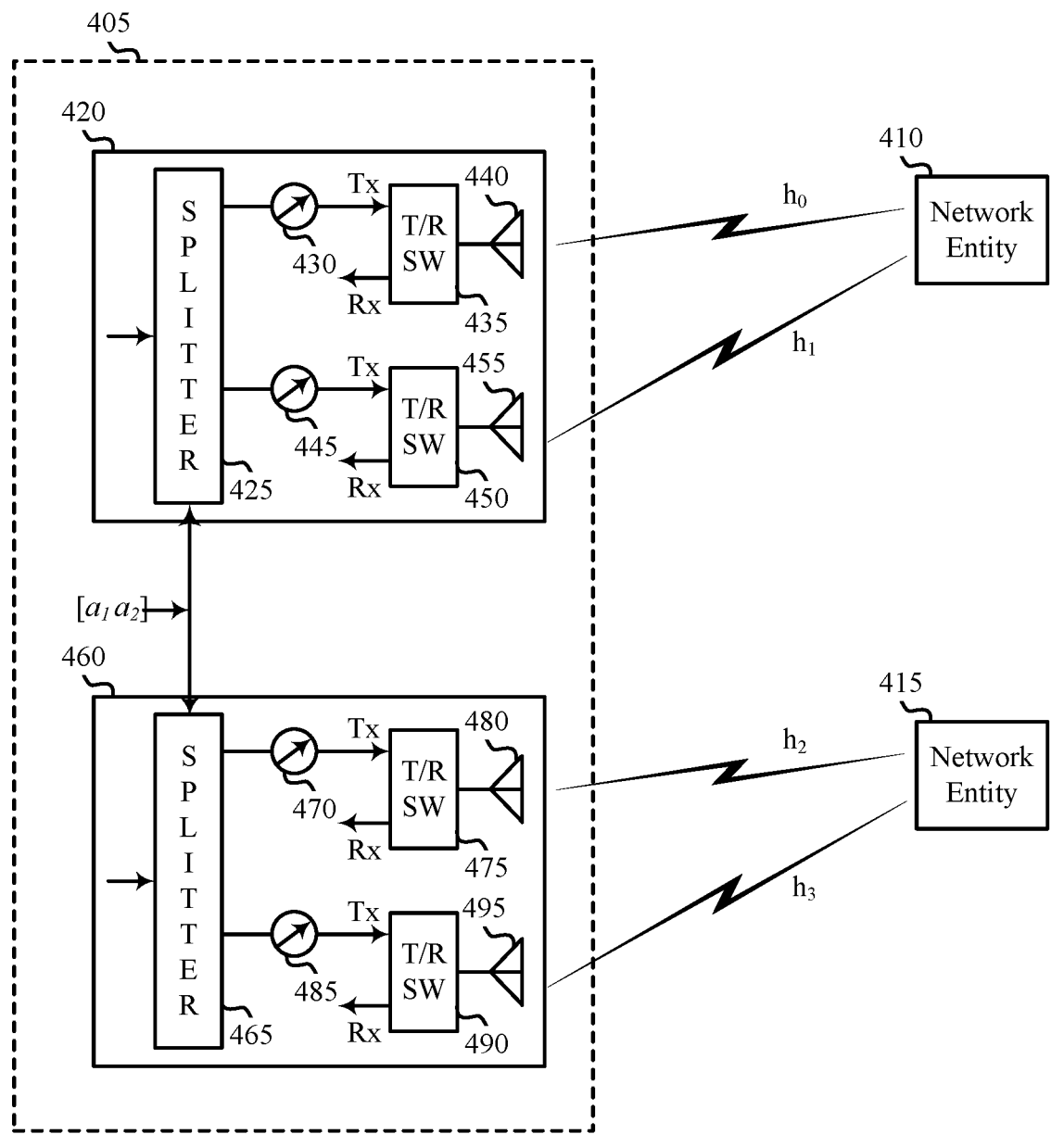
FIG. 4 illustrates an example of a wireless communications system that supports zero-delay gap period SRS transmissions with antenna switching in accordance with one or more aspects of the present disclosure.

FIG. 4 illustrates an example of a wireless communications system 400 that supports zero-delay gap period SRS transmissions with antenna switching in accordance with one or more aspects of the present disclosure. Wireless communications system 400 may implement aspects of wireless communications systems 100 and/or 200 and/or implement aspects of transmit/receive coupling design 300. Wireless communications system 400 may include a UE 405, a network entity 410, and a network entity 415, which may be examples of the corresponding devices described herein.

The UE 405 illustrated in FIG. 4 is shown as having two transmit/receive designs (e.g., the transmit/receive design 420 and the transmit/receive design 460). However, it is to be understood that the UE 405 may include one transmit/receive design or more than two transmit/receive designs. Moreover, the features of channel sounding techniques performed by the UE 405 are initially described using one transmit/receive design (e.g., the transmit/receive design 420) and then channel sounding techniques are then described using both transmit/receive designs (e.g., both of the transmit/receive design 420 and the transmit/receive design 460). Moreover, the functions of the components of each transmit/receive design of the UE 405 may be considered the same between transmit/receive designs, where each function is previously discussed with reference to FIG. 3.

As discussed above, aspects of the techniques described herein generally provide for the UE 405 to perform successive SRS transmissions using a zero-delay gap period between the successive SRS transmissions. For example, the UE 405 may transmit or otherwise provide a first message to a network entity (e.g., the network entity 410). The first message may include UE capability reporting (e.g., a UE capability message and/or UE assistance information message) that indicates or otherwise identifies that the UE 405 supports performing the antenna switching using the zero-delay gap period between success SRS transmissions. In response, the network entity may transmit or otherwise provide a second message to the UE 405. The second message may indicate or otherwise identify a set of SRS parameters for the UE 405. The set of SRS parameters may identify or otherwise indicate the resources and/or transmission properties that the UE 405 is to use for the SRS transmissions. The set of SRS transmission properties may indicate that the UE 405 is to use antenna switching with the zero-delay gap period between successive SRS transmissions. The UE 405 may perform the successive SRS transmissions using the zero-delay gap period between SRS transmission instances and according to the set of SRS parameters.

Referring initially to the transmit/receive design 420 of the UE 405, the transmit/receive design 420 may perform the successive SRS transmissions using the zero-delay gap period during different SRS transmission instances and precoding. For example, the UE 405 may transmit or otherwise provide a SRS transmission from a pair of antennas (e.g., the antenna 440) and the antenna 455) during a first SRS transmission instance (e.g., during a first SRS transmission opportunity). The UE 405 may perform the SRS transmission from the pair of antennas during the first SRS transmission instance according to a first precoder that applies a zero-degree phase shift to the SRS transmissions from each antenna. During the next SRS transmission instance (e.g., a second SRS transmission instance), the UE 405 may transmit or otherwise provide a SRS transmission from the same pair of antennas (e.g., the antenna 440) and the antenna 455) during the second SRS transmission instance (e.g., during a second SRS transmission opportunity). The UE 405 may perform the SRS transmission from the pair of antennas during the second SRS transmission instance according to a second precoder that applies a zero-degree phase shift to the SRS transmissions from one antenna and applies a 180-degree phase shift to the other antenna in the pair of antennas. Sounding both antennas may support reciprocity based beamforming, such as when receiving beamformed downlink transmissions from the network entity 410.

More particularly, a first SRS transmission instance may include the single digital transmit signal input into the splitter 425 being split and applied to both the phase shifter 430 to be coupled to the antenna 440 via the transmit/receive switch 435 and to the phase shifter 445 to be coupled to the antenna 455 via the transmit/receive switch 450. During the first SRS transmission instance, the first precoder may be considered a [1 1] precoder. Applying the first precoder may include the phase shifter 430 and the phase shifter 445 both applying the zero degree to the single digital transmit signal before coupling the signal to their respective antennas. The second SRS transmission instance may also include the single digital transmit signal input into the splitter 425 being split and applied to both the phase shifter 430 to be coupled to the antenna 440 via the transmit/receive switch 435 and to the phase shifter 445 to be coupled to the antenna 455 via the transmit/receive switch 450. However, during the second SRS transmission instance, the second precoder may be considered a [1-1] precoder. Applying the second precoder may include the phase shifter 430 applying the zero degree to the signal and the phase shifter 445 applying the 180-degree phase shift to the signal before coupling the signal to their respective antennas. That is, the phase shifters of the transmit/receive design 420 may be set to [0°, 0° ] during the first SRS transmission instance to apply the first precoder and to [0°, 180° ] during the second SRS transmission instance to apply the second precoder.

It is to be understood that the transmit/receive design 460 may be configured or otherwise support similar techniques discussed relative to the transmit/receive design 420. For example, a first (or third) SRS transmission instance may include the single digital transmit signal input into the splitter 465 being split and applied to both the phase shifter 470 to be coupled to the antenna 480 via the transmit/receive switch 475 and to the phase shifter 485 to be coupled to the antenna 495 via the transmit/receive switch 490. The second (or fourth) SRS transmission instance may also include the single digital transmit signal input into the splitter 465 being split and applied to both the phase shifter 470 to be coupled to the antenna 480 via the transmit/receive switch 475 and to the phase shifter 485 to be coupled to the antenna 495 via the transmit/receive switch 490.

This may permit the UE 405 to sound both antennas during the first SRS transmission instance using the [1 1] precoder, followed by sounding the same antennas during the second SRS transmission instance using the [1-1] precoder. Performing the successive SRS transmissions during the first and second SRS transmission instances may be represented as the following precoding matrix:

$$W = \begin{pmatrix} 1 & 1 \\ 1 & -1 \end{pmatrix}$$

where time is represented on the horizontal scale and the pair of antennas are represented on the vertical scale. The network entity 410 may make two separate observations (e.g., receive the successive SRS transmissions) and determine the underlying channel performance metrics corresponding to the pair of antennas using the formula:

$$y = \begin{pmatrix} y_0 \\ y_1 \end{pmatrix} = Wh + n = \begin{pmatrix} h_0 + h_1 \\ h_0 - h_1 \end{pmatrix} + \begin{pmatrix} n_0 \\ n_1 \end{pmatrix} \rightarrow \hat{h} = \begin{pmatrix} \hat{h}_0 \\ \hat{h}_1 \end{pmatrix} = W^{-1}y = \frac{1}{2}\begin{pmatrix} y_0 + y_1 \\ y_0 - y_1 \end{pmatrix}$$

For downlink operations, implementation of the transmit/receive design 420 using the splitter/phase-shifter design may be transparent from the perspective of the network entity 410. That is, the network entity 410 may, instead of estimating the channel using individual antenna ports, the network entity 410 may estimate the channel using the successive SRS transmissions from the pair of antennas. The network entity 410 may estimate the $h_0+h_1$ and $h_0-h_1$ using the successive SRS transmissions according to the first and second precoders (e.g., according to a precoding matrix indicated in the set of SRS parameters). For downlink operations supported using the antenna switching use case for SRS, the UE 405 may sound the two virtual ports corresponding to the [1 1] and [1-1] precoders. When the network entity 410 is unaware of the implementation of the splitter/phase-shifter approach to transmit/receive design, the network entity 410 may continue to schedule SRS transmissions with a gap period (e.g., based on the network entity 410 assuming that the UE 405 is using the analog switching techniques, rather than the splitter/phase-shifter design approach. However, once the UE 405 informs the network entity 410 that it supports successive SRS transmissions with antenna switching with the zero-delay gap period between the successive SRS transmission instances, the network entity 410 may allocate the SRS without a delay gap (e.g., with the zero-delay gap period). When the network entity 410 is informed that the UE 405 supports the zero-delay gap period, it may schedule channel sounding using the individual ports of the pair of antennas (e.g., sounding one antenna per transmission instance) or may sound the channel using the virtual antenna ports (e.g., sounding both antennas per transmission instance, with the difference between successive SRS transmissions being the phase-shift applied to the signals being transmitted from each antenna during each instance).

For uplink operations, the network entity 410 may be aware (e.g., based on UE capability reporting) that the UE 405 supports antenna switching for successive SRS transmissions using the zero-delay gap period. This permits the UE 405 to sound both virtual ports (e.g., the pair of antennas per-SRS transmission precoder, such as the first and second precoders) using the [1 1] and [1-1] precoders over separate symbols or sub-symbols. The network entity 410 may estimate the underlying channels $h_0$ and $h_1$ and determine the best way to form the virtual port using analog beamforming. In some examples, the network entity 410 may signal the appropriate precoders back to the UE 405 (e.g., such as in the set of SRS parameters or in separate signaling). The signaled precoder (e.g., precoding matrix) may include the phase rotation to be applied by each phase shifter in the transmit/receive design. In some examples, the phase rotation (e.g., rotational angle) may be signaled in the form [1 $e^{j\theta}$]. In some examples, the UE 405 may not be able to support any value of $\theta$ and, therefore, may indicate or otherwise inform the network entity 410 of a set of values of $\theta$ that are supported (e.g., in UE capability signaling). In some examples, the set of supported values of $\theta$ may be known by both the network entity 410 and the UE 405 (e.g., adopted in the standards).

Adoption of the splitter/phase-shifter transmit/receive design further improves beamforming operations of the UE 405. That is, the transmit/receive design 420 and the transmit/receive design 460 may be used to support downlink assisted uplink transmit beamforming operations at the UE 405. The splitter/phase-shifter architecture opens new avenues for uplink beamforming at the UE 405.

In some examples of uplink beamforming, the UE 405 may signal its ports (where each port corresponds to a unique single digital transmit signal-to-antenna coupling) to be used for uplink transmission (e.g., via SRS associated with usage set to codebook). The network entity 410 determines the best precoder for the UE 405 and signals this back to the UE 405 (e.g., using a transmitted precoding matrix indicator (TPMI) indicated in a DCI). The UE 405 uses the signaled precoder in the uplink transmissions.

However and based on using the splitter/phase-shifter transmit/receive design, in addition to the digital precoding (shown as [a₁ a₂] in FIG. 4), analog precoding coefficients may also be optimized (e.g., [1 1] and [1-1], which correspond to the phase shift being applied to each transmitted signal). Generally, this may include the rotation angle for the phase shifter 445 being represented as Ø and the rotational angle for the phase shifter 485 being represented as 0. Using this approach, multiple procedures may be adopted to further optimize uplink beamforming using the analog precoders corresponding to the phase shifters.

A first procedure may include a downlink assisted procedure to compute the analog beamforming coefficients. This may include the network entity 410 transmitting or otherwise providing downlink reference signals (e.g., reference signal transmission(s), such as CSI-RS) to the UE 405. The UE 405 estimates the downlink channel on each antenna and assumes reciprocity to determine the best transmit beamforming weights. The transmit beamforming weights may be optimized for each analog beamforming (ABF) group separately or jointly across all ABF groups. Accordingly, the UE 405 may select or otherwise identify analog precoder(s) for a pair of antennas based on the digital precoder(s) and the reference signal transmissions from the network entity 410. This procedure may leverage uplink and downlink reciprocity for the channel.

A second procedure may use explicit sounding to determine the analog beamforming weights. For example, the UE 405 may sound the SRS ports (e.g., four ports, two each per ABF group in FIG. 4). The UE 405 may use virtualization using precoders [1 1] and [1-1] precoders across ports within an ABF group. The SRS ports within an ABF group may be transmitted in separate symbols. The network entity 410 may estimate the four underlying ports and compute or otherwise determine the best transmit beamforming weights. The network entity 410 may signal these transmit beamforming weights (e.g., the analog precoders) back to the UE 405 (e.g., in the set of SRS parameters or in separate signaling). This procedure may not require uplink and downlink reciprocity for the channel.

In some examples, the network entity 410 and/or the UE 405 may select between the first procedure or the second procedure for channel sounding based on the uplink and downlink reciprocity of the channel relative to a threshold. In some examples, the network entity 410 and/or the UE 405 may use the first or second procedure to determine a coarse analog precoder matrix and then combine both procedures to determine a fine precoding matrix.

In some aspects, the set of SRS parameters may indicate or otherwise identify the first and second SRS transmission instances. As also discussed above, in some examples the successive SRS transmission instances may be symbol-level time periods (e.g., each SRS transmission instance occurs in a different symbol) or a sub-symbol level time period (e.g., both SRS transmission instances occur in the same symbol). In some examples, such sub-symbol time periods may be implemented my using a modified SCS for the successive SRS transmissions. For example, the modified SCS may include the set of SRS parameters indicating a SCS to be used for the successive SRS transmissions that is different from the SCS being used for ongoing wireless communications within the network. For example, the network may be using a 15 kHz SCS where a 1 ms slot is divided into fourteen symbols and the SCS indicted in the set of SRS parameters may use a SCS of 30 kHz where the slot duration is 0.5 ms, which is also divided into fourteen symbols. The symbol duration of the 15 kHz SCS is longer than the symbol duration of the 30 KHz SCS. The set of SRS parameters may schedule the successive SRS transmissions across two symbols of the 30 KHz SCS, which may overlap in the time domain with one symbol of the network's 15 kHz SCS.

In some aspects, this may improve CSI acquisition efficiency. One advantage of a UE being configured with a 2T2R architecture (e.g., two transmit chains and two receive chains, each chain coupled to its own antenna) is that more uplink ports can be sounded simultaneously (e.g., in a single SRS symbol, two ports can be transmitted). This enables faster CSI estimation by the network. However, with the analog switching transmit/receive design at least two symbols—with an intervening delay gap—may be used for CSI acquisition by the network. This presents an increased overhead for CSI acquisition and also increases longer. The splitter/phase-shifter transmit/receive design (e.g., as shown in the transmit/receive design 420 and the transmit/receive design 460) allows for CSI acquisition similar to the 2T2R architecture. For example, the splitter/phase-shifter transmit/ receive design enables multi-port channel sounding within one symbol duration. Moreover, since the zero-delay gap period is used in the splitter/phase-shifter transmit/receive design, sub-symbol SRS sounding may be supported where the UE 405 uses the [1 1] precoder (e.g., analog precoder) during the first half of a symbol and use the [1−1] precoder during the second half of the symbol. As discussed above, this may be accomplished by using a SCS that is twice the SCS associated with other symbols (e.g., nominal or network SCS is 15 KHz while SRS SCS is 30 kHz).

Figure 5:
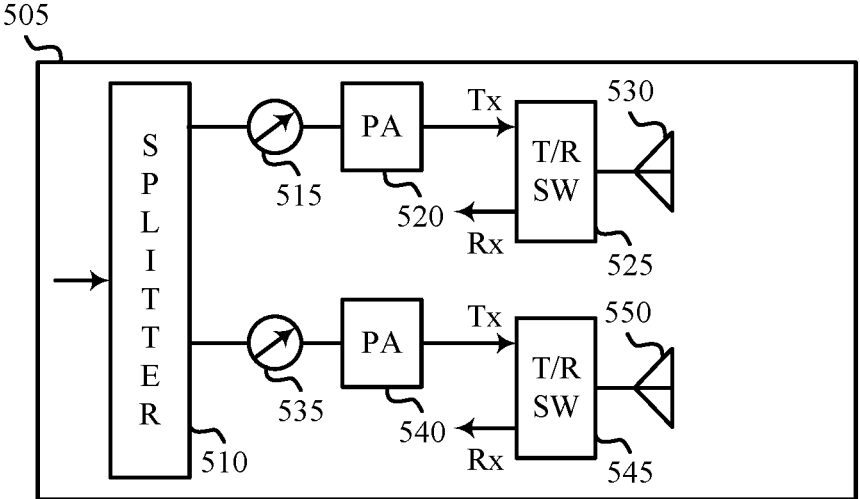
FIG. 5 illustrates an example of a transmit/receive coupling design that supports zero-delay gap period SRS transmissions with antenna switching in accordance with one or more aspects of the present disclosure.
Figure 5:

FIG. 5 illustrates an example of a transmit/receive coupling design 500 that supports zero-delay gap period SRS transmissions with antenna switching in accordance with one or more aspects of the present disclosure. The transmit/receive coupling design 500 may implement aspects of wireless communications systems 100, 200, and/or 400 and/or may implement aspects of transmit/receive coupling design 300. The transmit/receive coupling design 500 may include a transmit/receive design 505 implemented at a UE, which may be an example of the corresponding devices described herein.

The transmit/receive design 505 illustrates another example of a splitter/phase-shifter transmit/receive design, as discussed above with respect to successive SRS transmissions using antenna switching with a zero-delay gap period. For example, each SRS transmission instance may include the single digital transmit signal input into the splitter 510 being split and applied to both the phase shifter 515 to be coupled to the antenna 530 via the transmit/receive switch 525 and to the phase shifter 535 to be coupled to the antenna 550 via the transmit/receive switch 545. During the first SRS transmission instance, a first precoder (e.g., analog precoder) may be considered a [1 1] precoder that is applied to the transmitted signal by the phase shifters and, during a second SRS transmission instance, a second precoder (e.g., analog precoder) may be considered a [1−1] precoder that is applied to the transmitted signal by the phase shifters. The analog precoders may be signaled from the network or identified or otherwise determined by the UE. The phase shifters of the transmit/receive design 505 may be set to [0°, 0° ] during the first SRS transmission instance to apply the first precoder and to [0°, 180° ] during the second SRS transmission instance to apply the second precoder.

However, the transmit/receive design 505 also include power amplifier (PA) 520 and PA 540, which provides each antenna with its own PA. The PA is placed between the splitter and the transmit/receive switch (e.g., PA 520 is between phase shifter 515 and transmit/receive switch 525 and PA 540 is between phase shifter 535 and transmit/receive switch 545). This permits each uplink port to be powered by two PAs (e.g., a virtual uplink port formed using both antennas, where each of the antennas includes its own PA). Determining a separate power per PA—with accommodations for unequal power splitting across the two PAs—may further optimize uplink performance, such as for SRS transmissions, uplink beamforming, and the like. Accordingly, in some examples the UE may apply a first gain for a first PA (e.g., the PA 520) of the first antenna (e.g., the antenna 530) performing a SRS transmission during the first SRS transmission instance and a second gain for a second PA (e.g., PA 540) of the second antenna (e.g., the antenna 550) performing a SRS transmission during the second SRS transmission instance.

Figure 6:
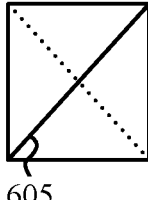
FIG. 6 illustrates an example of a mapping layout that supports zero-delay gap period SRS transmissions with antenna switching in accordance with one or more aspects of the present disclosure.
Figure 6:
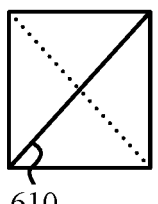
Figure 6:
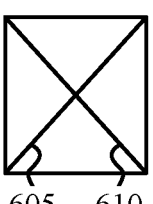

FIG. 6 illustrates an example of a mapping layout 600 that supports zero-delay gap period SRS transmissions with antenna switching in accordance with one or more aspects of the present disclosure. Mapping layout 600 may implement aspects of wireless communications systems 100, 200, and/or 400 and/or implement aspects of transmit/receive coupling designs 300 and/or 500. Aspects of mapping layout 600 may be implemented at or implemented by a UE, which may be an example of the corresponding devices described herein.

In some examples, the antennas in an antenna pair may be co-polarized or cross-polarized. Mapping layout 600 illustrates two mapping layouts that may be adopted for the antennas forming the pair of antennas (as discussed herein). More particularly, mapping layout 600 illustrates two options for time domain-orthogonal cover code (TD-OCC) port mappings. In a first mode (e.g., mode 0), the first antenna 605 of the pair of antennas may be co-polarized with respect to the second antenna 610 of the pair of antennas. Co-polarized antennas broadly refers to antennas that are oriented to be parallel to each other. That is, in mode 0 the TD-OCC ports may be mapped to two adjacent antenna with the same polarization. In a second mode (e.g., mode 1), the first antenna 605 of the pair of antennas may be cross-polarized with respect to the second antenna 610 of the pair of antennas. Cross-polarized antennas broadly refers to antennas that are oriented to be perpendicular to each other. That is, in mode 1 the TD-OCC ports may be mapped to the same antenna with different polarization.

Figure 7:
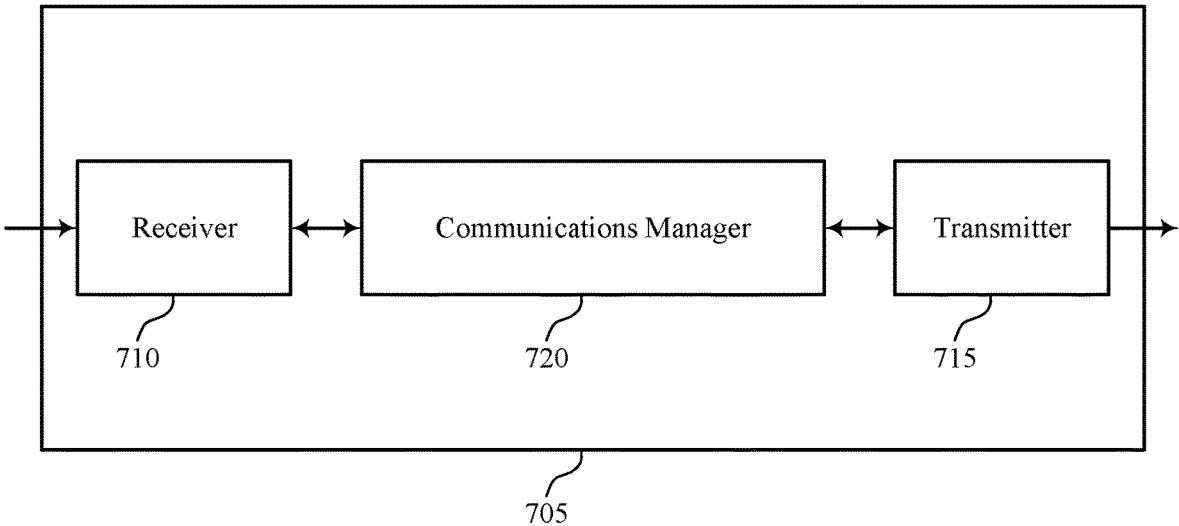
FIGS. 7 and 8 illustrate block diagrams of devices that support zero-delay gap period SRS transmissions with antenna switching in accordance with one or more aspects of the present disclosure.

FIG. 7 illustrates a block diagram 700 of a device 705 that supports zero-delay gap period SRS transmissions with antenna switching in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to zero-delay gap period SRS transmissions with antenna switching). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to zero-delay gap period SRS transmissions with antenna switching). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of zero-delay gap period SRS transmissions with antenna switching as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. For example, the communications manager 720 may be configured as or otherwise support a means for transmitting a first message indicating a UE capability to perform antenna-switching using a zero-delay gap period between successive transmissions of a SRS using different antennas of the UE. The communications manager 720 may be configured as or otherwise support a means for receiving a second message indicating a set of SRS parameters for the UE, the set of SRS parameters based on the UE capability. The communications manager 720 may be configured as or otherwise support a means for performing the successive transmissions of the SRS using the zero-delay gap period between the successive transmissions of the SRS according to the set of SRS parameters.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for a splitter/phase-shifter transmit/receive design that support a zero-delay gap period between successive transmissions using antenna switching.

Figure 8:

FIG. 8 illustrates a block diagram 800 of a device 805 that supports zero-delay gap period SRS transmissions with antenna switching in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to zero-delay gap period SRS transmissions with antenna switching). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to zero-delay gap period SRS transmissions with antenna switching). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of zero-delay gap period SRS transmissions with antenna switching as described herein. For example, the communications manager 820 may include a UE capability manager 825, an SRS configuration manager 830, an SRS transmission manager 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a UE in accordance with examples as disclosed herein. The UE capability manager 825 may be configured as or otherwise support a means for transmitting a first message indicating a UE capability to perform antenna-switching using a zero-delay gap period between successive transmissions of a SRS using different antennas of the UE. The SRS configuration manager 830 may be configured as or otherwise support a means for receiving a second message indicating a set of SRS parameters for the UE, the set of SRS parameters based on the UE capability. The SRS transmission manager 835 may be configured as or otherwise support a means for performing the successive transmissions of the SRS using the zero-delay gap period between the successive transmissions of the SRS according to the set of SRS parameters.

Figure 9:
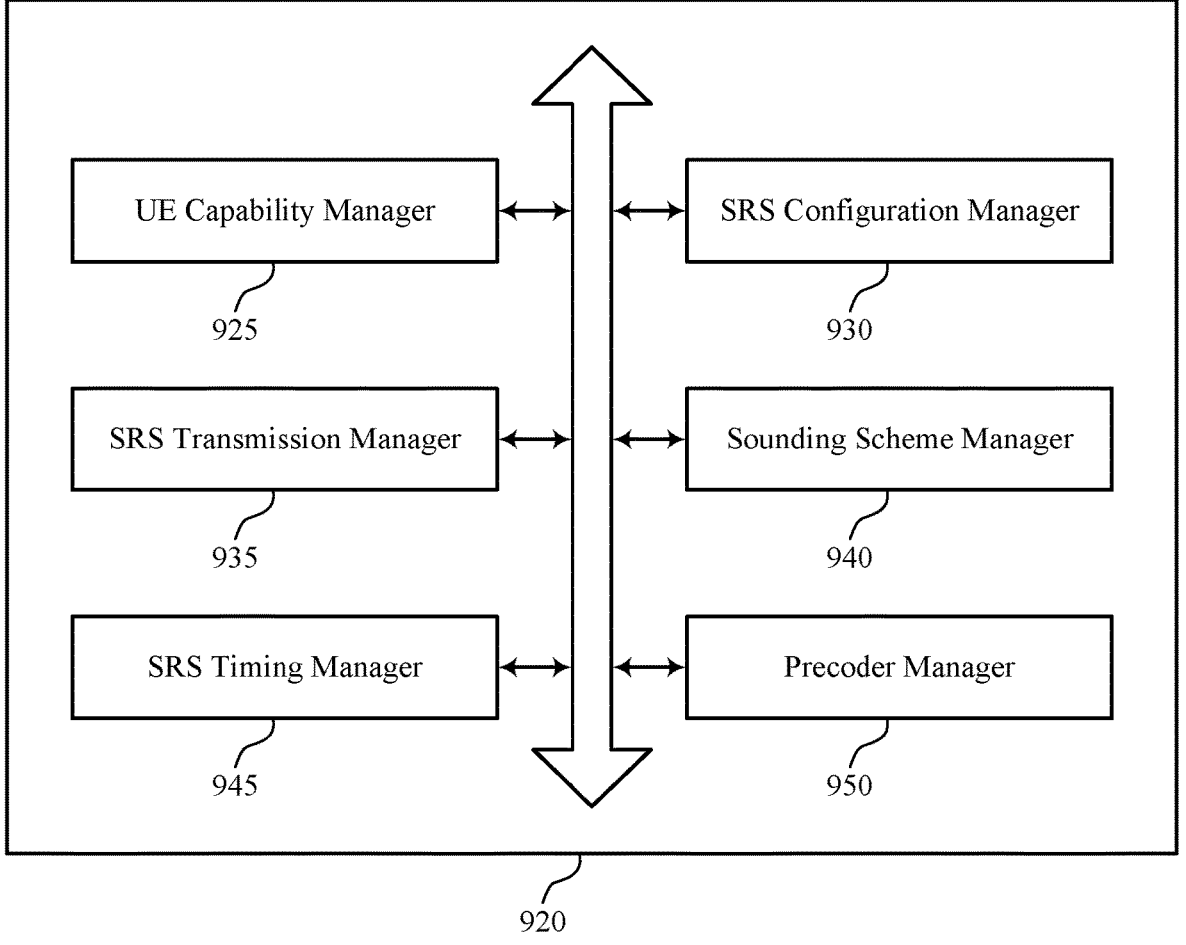
FIG. 9 illustrates a block diagram of a communications manager that supports zero-delay gap period SRS transmissions with antenna switching in accordance with one or more aspects of the present disclosure.

FIG. 9 illustrates a block diagram 900 of a communications manager 920 that supports zero-delay gap period SRS transmissions with antenna switching in accordance with one or more aspects of the present disclosure. The communications manager 920 may be an example of aspects of a communications manager 720, a communications manager 820, or both, as described herein. The communications manager 920, or various components thereof, may be an example of means for performing various aspects of zero-delay gap period SRS transmissions with antenna switching as described herein. For example, the communications manager 920 may include a UE capability manager 925, an SRS configuration manager 930, an SRS transmission manager 935, a sounding scheme manager 940, an SRS timing manager 945, a precoder manager 950, or any combination thereof. Each of these components may communicate, directly or indirectly, with one another (e.g., via one or more buses).

The communications manager 920 may support wireless communications at a UE in accordance with examples as disclosed herein. The UE capability manager 925 may be configured as or otherwise support a means for transmitting a first message indicating a UE capability to perform antenna-switching using a zero-delay gap period between successive transmissions of a SRS using different antennas of the UE. The SRS configuration manager 930 may be configured as or otherwise support a means for receiving a second message indicating a set of SRS parameters for the UE, the set of SRS parameters based on the UE capability. The SRS transmission manager 935 may be configured as or otherwise support a means for performing the successive transmissions of the SRS using the zero-delay gap period between the successive transmissions of the SRS according to the set of SRS parameters.

In some examples, to support performing the successive transmissions of the SRS using the zero-delay gap period, the sounding scheme manager 940 may be configured as or otherwise support a means for transmitting the SRS from a pair of antennas during a first SRS transmission instance according to a first precoder such that a zero-degree phase shift is applied to the SRS at a first antenna and a second antenna of the pair of antennas. In some examples, to support performing the successive transmissions of the SRS using the zero-delay gap period, the sounding scheme manager 940 may be configured as or otherwise support a means for transmitting the SRS from the pair of antennas during a second SRS transmission instance according to a second precoder such that a zero-degree phase shift is applied to the SRS at the first antenna of the pair of antennas and a 180-degree phase shift is applied to the SRS at the second antenna of the pair of antennas.

In some examples a first phase-shifter and a second phase-shifter apply the first precoder during the first SRS transmission instance and the second precoder during the second SRS transmission instance.

In some examples, the sounding scheme manager 940 may be configured as or otherwise support a means for applying a first gain for a first power amplifier of the first antenna performing the SRS transmission during the first SRS transmission instance and a second gain for a second power amplifier of the second antenna performing the SRS transmission during the second SRS transmission instance. In some examples, the first antenna and the second antenna of the pair of antennas include a co-polarized antenna pair or a cross-polarized antenna pair. In some examples, the sounding scheme manager 940 may be configured as or otherwise support a means for identifying, based on the set of SRS parameters, a precoding matrix including the first precoder and the second precoder.

In some examples, the SRS timing manager 945 may be configured as or otherwise support a means for identifying, based on the set of SRS parameters, a first SRS transmission instance and a second SRS transmission instance. In some examples, the first SRS transmission instance and the second SRS transmission instance include sub-symbol level time periods or symbol level time periods. In some examples, the SRS timing manager 945 may be configured as or otherwise support a means for applying a modified subcarrier spacing for the successive transmissions of SRS.

In some examples, the precoder manager 950 may be configured as or otherwise support a means for receiving one or more reference signal transmissions. In some examples, the precoder manager 950 may be configured as or otherwise support a means for selecting one or more analog precoders for a pair of antennas based on the one or more reference signal transmissions. In some examples, the precoder manager 950 may be configured as or otherwise support a means for receiving an indication of one or more analog precoders for a pair of antennas based on the successive transmissions of the SRS.

Figure 10:
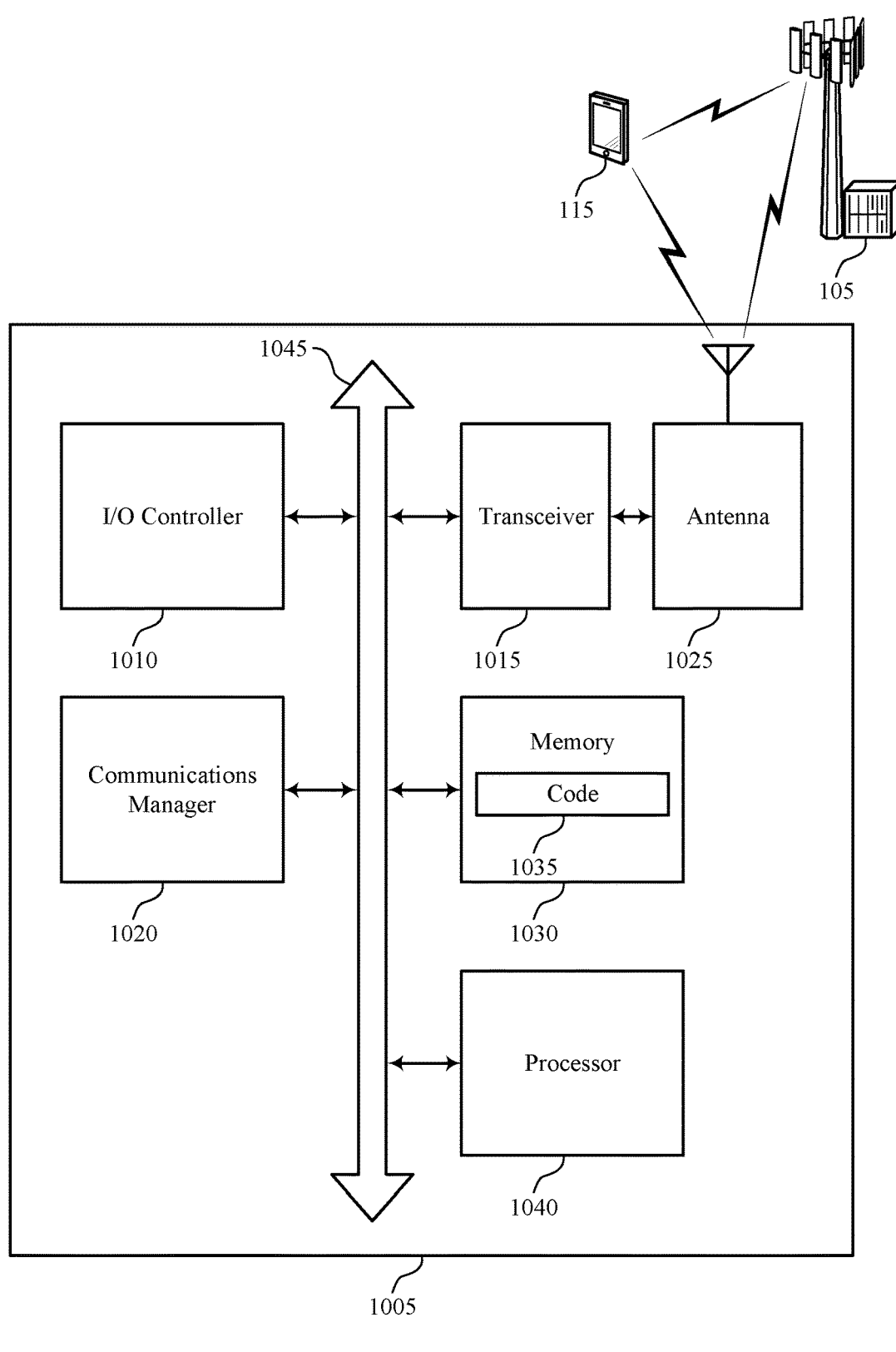
FIG. 10 illustrates a diagram of a system including a device that supports zero-delay gap period SRS transmissions with antenna switching in accordance with one or more aspects of the present disclosure.

FIG. 10 illustrates a diagram of a system 1000 including a device 1005 that supports zero-delay gap period SRS transmissions with antenna switching in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOSR, ANDROIDR, MS-DOSR, MS-WINDOWSR, OS/2R, UNIXR, LINUXR, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting zero-delay gap period SRS transmissions with antenna switching). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for transmitting a first message indicating a UE capability to perform antenna-switching using a zero-delay gap period between successive transmissions of a SRS using different antennas of the UE. The communications manager 1020 may be configured as or otherwise support a means for receiving a second message indicating a set of SRS parameters for the UE, the set of SRS parameters based on the UE capability. The communications manager 1020 may be configured as or otherwise support a means for performing the successive transmissions of the SRS using the zero-delay gap period between the successive transmissions of the SRS according to the set of SRS parameters.

By including or configuring the communications manager 1020 in accordance with examples as described herein, the device 1005 may support techniques for a splitter/phase-shifter transmit/receive design that support a zero-delay gap period between successive transmissions using antenna switching.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device

1005 to perform various aspects of zero-delay gap period SRS transmissions with antenna switching as described herein, or the processor 1040 and the memory 1030 may be otherwise configured to perform or support such operations.

Figure 11:
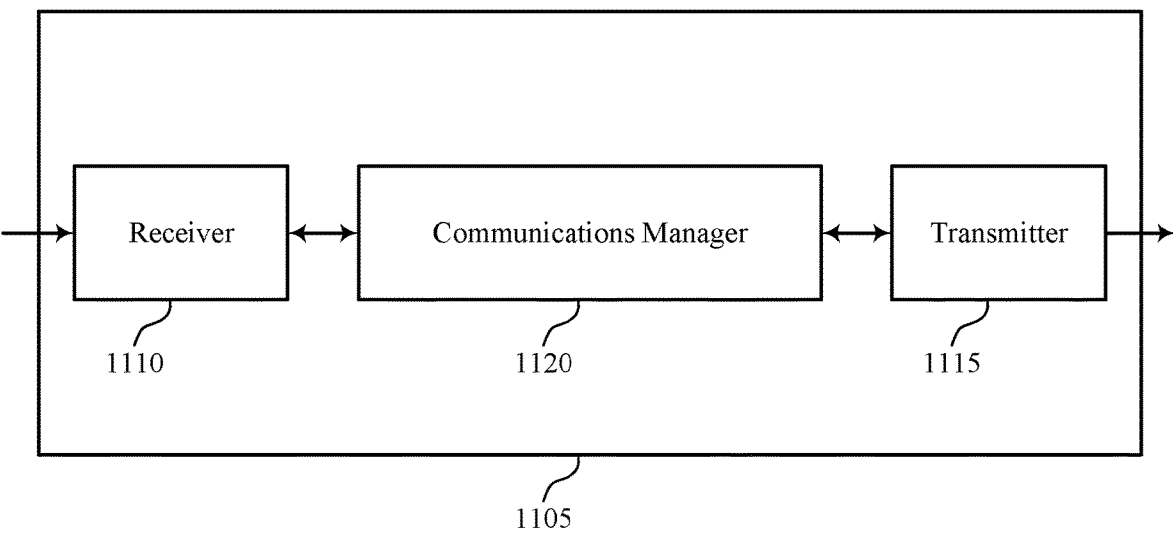
FIGS. 11 and 12 illustrate block diagrams of devices that support zero-delay gap period SRS transmissions with antenna switching in accordance with one or more aspects of the present disclosure.

FIG. 11 illustrates a block diagram 1100 of a device 1105 that supports zero-delay gap period SRS transmissions with antenna switching in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of zero-delay gap period SRS transmissions with antenna switching as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. For example, the communications manager 1120 may be configured as or otherwise support a means for receiving, from a UE, a first message indicating a UE capability to perform antenna-switching using a zero-delay gap period between successive transmissions of a SRS using different antennas of the UE. The communications manager 1120 may be configured as or otherwise support a means for transmitting a second message indicating a set of SRS parameters for the UE, the set of SRS parameters based on the UE capability. The communications manager 1120 may be configured as or otherwise support a means for receiving the successive transmissions of the SRS using the zero-delay gap period between the successive transmissions of the SRS according to the set of SRS parameters.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for a splitter/phase-shifter transmit/receive design that support a zero-delay gap period between successive transmissions using antenna switching.

Figure 12:
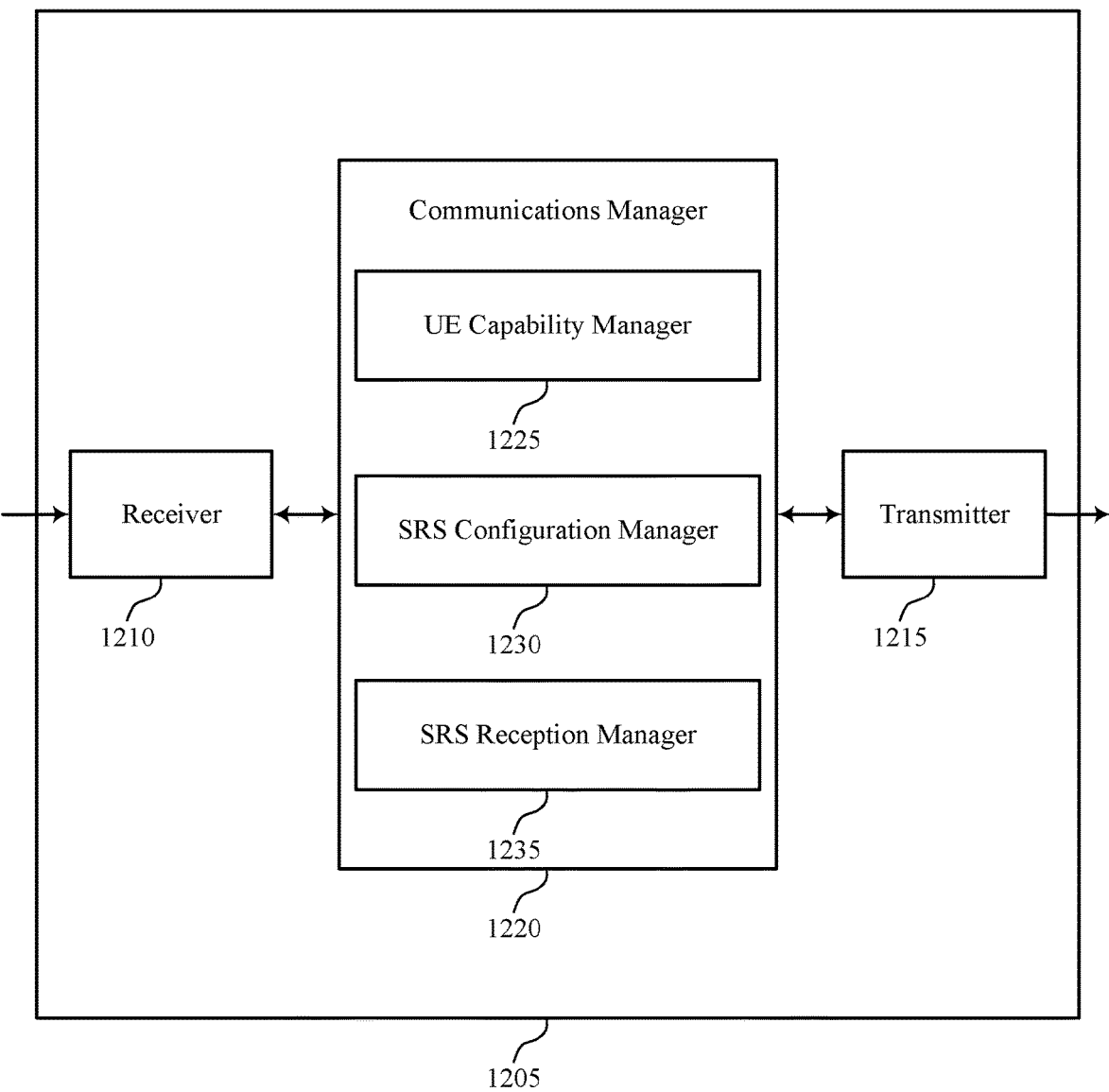

FIG. 12 illustrates a block diagram 1200 of a device 1205 that supports zero-delay gap period SRS transmissions with antenna switching in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of zero-delay gap period SRS transmissions with antenna switching as described herein. For example, the communications manager 1220 may include a UE capability manager 1225, an SRS configuration manager 1230, an SRS reception manager 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a network entity in accordance with examples as disclosed herein. The UE capability manager 1225 may be configured as or otherwise support a means for receiving, from a UE, a first message indicating a UE capability to perform antenna-switching using a zero-delay gap period between successive transmissions of a SRS using different antennas of the UE. The SRS configuration manager 1230 may be configured as or otherwise support a means for transmitting a second message indicating a set of SRS parameters for the UE, the set of SRS parameters based on the UE capability. The SRS reception manager 1235 may be configured as or otherwise support a means for receiving the successive transmissions of the SRS using the zero-delay gap period between the successive transmissions of the SRS according to the set of SRS parameters.

Figure 13:
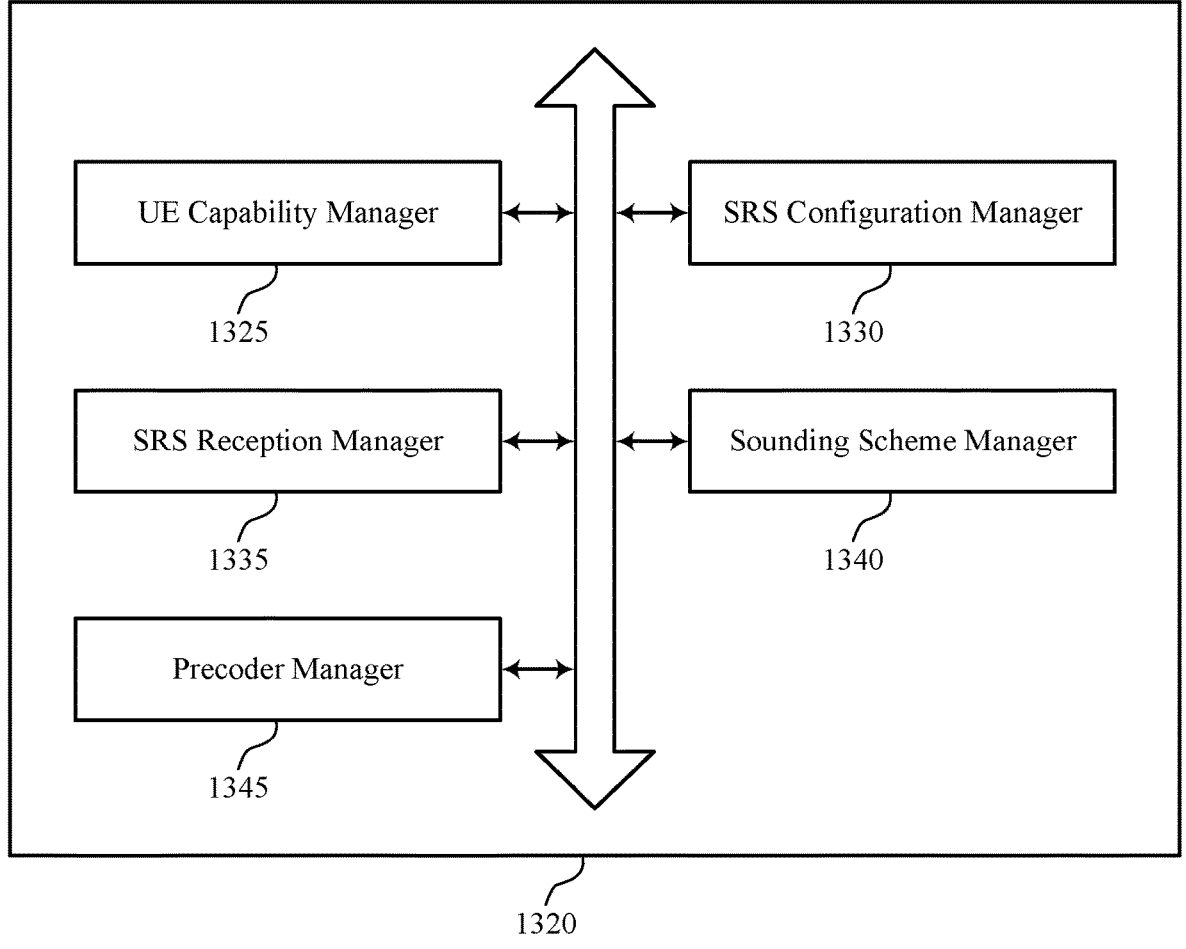
FIG. 13 illustrates a block diagram of a communications manager that supports zero-delay gap period SRS transmissions with antenna switching in accordance with one or more aspects of the present disclosure.

FIG. 13 illustrates a block diagram 1300 of a communications manager 1320 that supports zero-delay gap period SRS transmissions with antenna switching in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of zero-delay gap period SRS transmissions with antenna switching as described herein. For example, the communications manager 1320 may include a UE capability manager 1325, an SRS configuration manager 1330, an SRS reception manager 1335, a sounding scheme manager 1340, a precoder manager 1345, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications at a network entity in accordance with examples as disclosed herein. The UE capability manager 1325 may be configured as or otherwise support a means for receiving, from a UE, a first message indicating a UE capability to perform antenna-switching using a zero-delay gap period between successive transmissions of a SRS using different antennas of the UE. The SRS configuration manager 1330 may be configured as or otherwise support a means for transmitting a second message indicating a set of SRS parameters for the UE, the set of SRS parameters based on the UE capability. The SRS reception manager 1335 may be configured as or otherwise support a means for receiving the successive transmissions of the SRS using the zero-delay gap period between the successive transmissions of the SRS according to the set of SRS parameters.

In some examples, to support receiving the successive transmissions of the SRS using the zero-delay gap period, the sounding scheme manager 1340 may be configured as or otherwise support a means for receiving the SRS from a pair of antennas of the UE during a first SRS transmission instance according to a first precoder such that a zero-degree phase shift is applied to the SRS at a first antenna and a second antenna of the pair of antennas. In some examples, to support receiving the successive transmissions of the SRS using the zero-delay gap period, the sounding scheme manager 1340 may be configured as or otherwise support a means for receiving the SRS from the pair of antennas of the UE during a second SRS transmission instance according to a second precoder such that a zero-degree phase shift is applied to the SRS at the first antenna of the pair of antennas and a 180-degree phase shift is applied to the SRS at the second antenna of the pair of antennas.

In some examples, the sounding scheme manager 1340 may be configured as or otherwise support a means for determining one or more analog precoders for a pair of antennas based on the SRS received during the first SRS transmission instance and during the second SRS transmission instance. In some examples, the sounding scheme manager 1340 may be configured as or otherwise support a means for transmitting an indication of the one or more analog precoders for the pair of antennas to the UE.

In some examples, the sounding scheme manager 1340 may be configured as or otherwise support a means for determining a precoding matrix for the successive transmissions of the SRS, where the set of SRS parameters indicates a precoding matrix including the first precoder and the second precoder. In some examples, the set of SRS parameters indicates a first SRS transmission instance and a second SRS transmission instance. In some examples, the first SRS transmission instance and the second SRS transmission instance include sub-symbol level time periods or symbol level time periods. In some examples, a modified subcarrier spacing is applied for the successive transmissions of SRS.

In some examples, the precoder manager 1345 may be configured as or otherwise support a means for transmitting one or more reference signal transmissions, where one or more analog precoders for a pair of antennas are selected based on the one or more reference signal transmissions.

Figure 14:
FIG. 14 illustrates a diagram of a system including a device that supports zero-delay gap period SRS transmissions with antenna switching in accordance with one or more aspects of the present disclosure.

FIG. 14 illustrates a diagram of a system 1400 including a device 1405 that supports zero-delay gap period SRS transmissions with antenna switching in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or memory components (for example, the processor 1435, or the memory 1425, or both), may be included in a chip or chip assembly that is installed in the device 1405. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting zero-delay gap period SRS transmissions with antenna switching). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405. The processor 1435 may be any one or more suitable processors capable of executing scripts or instructions of one or more software programs stored in the device 1405 (such as within the memory 1425). In some implementations, the processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1405 may transmit information output from the chip or modem. Additionally, or alternatively, in some implementations, the one or more interfaces may refer to an interface between the processing system of the chip or modem and a receiver, such that the device 1405 may obtain information or signal inputs, and the information may be passed to the processing system. A person having ordinary skill in the art will readily recognize that a first interface also may obtain information or signal inputs, and a second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communications at a network entity in accordance with examples as disclosed herein. For example, the communications manager 1420 may be configured as or otherwise support a means for receiving, from a UE, a first message indicating a UE capability to perform antenna-switching using a zero-delay gap period between successive transmissions of a SRS using different antennas of the UE. The communications manager 1420 may be configured as or otherwise support a means for transmitting a second message indicating a set of SRS parameters for the UE, the set of SRS parameters based on the UE capability. The communications manager 1420 may be configured as or otherwise support a means for receiving the successive transmissions of the SRS using the zero-delay gap period between the successive transmissions of the SRS according to the set of SRS parameters.

By including or configuring the communications manager 1420 in accordance with examples as described herein, the device 1405 may support techniques for a splitter/phase-shifter transmit/receive design that support a zero-delay gap period between successive transmissions using antenna switching.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, the processor 1435, the memory 1425, the code 1430, or any combination thereof. For example, the code 1430 may include instructions executable by the processor 1435 to cause the device 1405 to perform various aspects of zero-delay gap period SRS transmissions with antenna switching as described herein, or the processor 1435 and the memory 1425 may be otherwise configured to perform or support such operations.

FIG. 15 illustrates a flowchart illustrating a method 1500 that supports zero-delay gap period SRS transmissions with antenna switching in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include transmitting a first message indicating a UE capability to perform antenna-switching using a zero-delay gap period between successive transmissions of a SRS using different antennas of the UE. The operations of 1505 may be performed in accordance with examples as disclosed herein. In some examples, aspects of the operations of 1505 may be performed by a UE capability manager 925 as described with reference to FIG. 9.

At 1510, the method may include receiving a second message indicating a set of SRS parameters for the UE, the set of SRS parameters based on the UE capability. The operations of 1510 may be performed in accordance with examples as disclosed herein. In some examples, aspects of the operations of 1510 may be performed by an SRS configuration manager 930 as described with reference to FIG. 9.

At 1515, the method may include performing the successive transmissions of the SRS using the zero-delay gap period between the successive transmissions of the SRS according to the set of SRS parameters. The operations of 1515 may be performed in accordance with examples as disclosed herein. In some examples, aspects of the operations of 1515 may be performed by an SRS transmission manager 935 as described with reference to FIG. 9.

FIG. 16 illustrates a flowchart illustrating a method 1600 that supports zero-delay gap period SRS transmissions with antenna switching in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include transmitting a first message indicating a UE capability to perform antenna-switching using a zero-delay gap period between successive transmissions of a SRS using different antennas of the UE. The operations of 1605 may be performed in accordance with examples as disclosed herein. In some examples, aspects of the operations of 1605 may be performed by a UE capability manager 925 as described with reference to FIG. 9.

At 1610, the method may include receiving a second message indicating a set of SRS parameters for the UE, the set of SRS parameters based on the UE capability. The operations of 1610 may be performed in accordance with examples as disclosed herein. In some examples, aspects of the operations of 1610 may be performed by an SRS configuration manager 930 as described with reference to FIG. 9.

At 1615, the method may include performing the successive transmissions of the SRS using the zero-delay gap period between the successive transmissions of the SRS according to the set of SRS parameters. The operations of 1615 may be performed in accordance with examples as disclosed herein. In some examples, aspects of the operations of 1615 may be performed by an SRS transmission manager 935 as described with reference to FIG. 9.

At 1620, the method may include transmitting the SRS from a pair of antennas during a first SRS transmission instance according to a first precoder such that a zero-degree phase shift is applied to the SRS at a first antenna and a second antenna of the pair of antennas. The operations of 1620 may be performed in accordance with examples as disclosed herein. In some examples, aspects of the operations of 1620 may be performed by a sounding scheme manager 940 as described with reference to FIG. 9.

At 1625, the method may include transmitting the SRS from the pair of antennas during a second SRS transmission instance according to a second precoder such that a zero-degree phase shift is applied to the SRS at the first antenna of the pair of antennas and a 180-degree phase shift is applied to the SRS at the second antenna of the pair of antennas. The operations of 1625 may be performed in accordance with examples as disclosed herein. In some examples, aspects of the operations of 1625 may be performed by a sounding scheme manager 940 as described with reference to FIG. 9.

FIG. 17 illustrates a flowchart illustrating a method 1700 that supports zero-delay gap period SRS transmissions with antenna switching in accordance with one or more aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1705, the method may include transmitting a first message indicating a UE capability to perform antenna-switching using a zero-delay gap period between successive transmissions of a SRS using different antennas of the UE. The operations of 1705 may be performed in accordance with examples as disclosed herein. In some examples, aspects of the operations of 1705 may be performed by a UE capability manager 925 as described with reference to FIG. 9.

At 1710, the method may include receiving a second message indicating a set of SRS parameters for the UE, the set of SRS parameters based on the UE capability. The operations of 1710 may be performed in accordance with examples as disclosed herein. In some examples, aspects of the operations of 1710 may be performed by an SRS configuration manager 930 as described with reference to FIG. 9.

At 1715, the method may include identifying, based on the set of SRS parameters, a first SRS transmission instance and a second SRS transmission instance. The operations of 1715 may be performed in accordance with examples as disclosed herein. In some examples, aspects of the operations of 1715 may be performed by an SRS timing manager 945 as described with reference to FIG. 9.

At 1720, the method may include performing the successive transmissions of the SRS using the zero-delay gap period between the successive transmissions of the SRS according to the set of SRS parameters. The operations of 1720 may be performed in accordance with examples as disclosed herein. In some examples, aspects of the operations of 1720 may be performed by an SRS transmission manager 935 as described with reference to FIG. 9.

FIG. 18 illustrates a flowchart illustrating a method 1800 that supports zero-delay gap period SRS transmissions with antenna switching in accordance with one or more aspects of the present disclosure. The operations of the method 1800 may be implemented by a network entity or its components as described herein. For example, the operations of the method 1800 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1805, the method may include receiving, from a UE, a first message indicating a UE capability to perform antenna-switching using a zero-delay gap period between successive transmissions of a SRS using different antennas of the UE. The operations of 1805 may be performed in accordance with examples as disclosed herein. In some examples, aspects of the operations of 1805 may be performed by a UE capability manager 1325 as described with reference to FIG. 13.

At 1810, the method may include transmitting a second message indicating a set of SRS parameters for the UE, the set of SRS parameters based on the UE capability. The operations of 1810 may be performed in accordance with examples as disclosed herein. In some examples, aspects of the operations of 1810 may be performed by an SRS configuration manager 1330 as described with reference to FIG. 13.

At 1815, the method may include receiving the successive transmissions of the SRS using the zero-delay gap period between the successive transmissions of the SRS according to the set of SRS parameters. The operations of 1815 may be performed in accordance with examples as disclosed herein. In some examples, aspects of the operations of 1815 may be performed by an SRS reception manager 1335 as described with reference to FIG. 13.

FIG. 19 illustrates a flowchart illustrating a method 1900 that supports zero-delay gap period SRS transmissions with antenna switching in accordance with one or more aspects of the present disclosure. The operations of the method 1900 may be implemented by a network entity or its components as described herein. For example, the operations of the method 1900 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1905, the method may include receiving, from a UE, a first message indicating a UE capability to perform antenna-switching using a zero-delay gap period between successive transmissions of a SRS using different antennas of the UE. The operations of 1905 may be performed in accordance with examples as disclosed herein. In some examples, aspects of the operations of 1905 may be performed by a UE capability manager 1325 as described with reference to FIG. 13.

At 1910, the method may include transmitting a second message indicating a set of SRS parameters for the UE, the set of SRS parameters based on the UE capability. The operations of 1910 may be performed in accordance with examples as disclosed herein. In some examples, aspects of the operations of 1910 may be performed by an SRS configuration manager 1330 as described with reference to FIG. 13.

At 1915, the method may include receiving the successive transmissions of the SRS using the zero-delay gap period between the successive transmissions of the SRS according to the set of SRS parameters. The operations of 1915 may be performed in accordance with examples as disclosed herein. In some examples, aspects of the operations of 1915 may be performed by an SRS reception manager 1335 as described with reference to FIG. 13.

At 1920, the method may include transmitting one or more reference signal transmissions, where one or more analog precoders for a pair of antennas are selected based on the one or more reference signal transmissions. The operations of 1920 may be performed in accordance with examples as disclosed herein. In some examples, aspects of the operations of 1920 may be performed by a precoder manager 1345 as described with reference to FIG. 13.

The following provides an overview of aspects of the present disclosure:

Aspect 1: A method for wireless communication at a UE, comprising: transmitting a first message indicating a UE capability to perform antenna-switching using a zero-delay gap period between successive transmissions of a SRS using different antennas of the UE: receiving a second message indicating a set of SRS parameters for the UE, the set of SRS parameters based at least in part on the UE capability: and performing the successive transmissions of the SRS using the zero-delay gap period between the successive transmissions of the SRS according to the set of SRS parameters.

Aspect 2: The method of aspect 1, wherein performing the successive transmissions of the SRS using the zero-delay gap period comprises: transmitting the SRS from a pair of antennas during a first SRS transmission instance according to a first precoder such that a zero-degree phase shift is applied to the SRS at a first antenna and a second antenna of the pair of antennas: and transmitting the SRS from the pair of antennas during a second SRS transmission instance according to a second precoder such that a zero-degree phase shift is applied to the SRS at the first antenna of the pair of antennas and a 180-degree phase shift is applied to the SRS at the second antenna of the pair of antennas.

Aspect 3: The method of aspect 2, wherein performing the successive transmissions of the SRS using the zero-delay gap period comprises: outputting the SRS from a splitter to a first phase-shifter associated with the first antenna and a second phase-shifter associated with the second antenna, wherein the first phase-shifter applies the first precoder during the first SRS transmission instance and the second phase-shifter applies the second precoder during the second SRS transmission instance.

Aspect 4: The method of aspect 3, further comprising: applying a first gain for a first power amplifier of the first antenna performing the SRS transmission during the first SRS transmission instance and a second gain for a second power amplifier of the second antenna performing the SRS transmission during the second SRS transmission instance.

Aspect 5: The method of any of aspects 2 through 4, wherein the first antenna and the second antenna of the pair of antennas comprise a co-polarized antenna pair or a cross-polarized antenna pair.

Aspect 6: The method of any of aspects 2 through 5, further comprising: identifying, based at least in part on the set of SRS parameters, a precoding matrix comprising the first precoder and the second precoder.

Aspect 7: The method of any of aspects 1 through 6, further comprising: identifying, based at least in part on the set of SRS parameters, a first SRS transmission instance and a second SRS transmission instance.

Aspect 8: The method of aspect 7, wherein the first SRS transmission instance and the second SRS transmission instance comprise sub-symbol level time periods or symbol level time periods.

Aspect 9: The method of aspect 8, further comprising: applying a modified subcarrier spacing for the successive transmissions of SRS.

Aspect 10: The method of any of aspects 1 through 9, further comprising: receiving one or more reference signal transmissions: and selecting one or more analog precoders for a pair of antennas based at least in part on one or more digital precoders for the pair of antennas and the one or more reference signal transmissions.

Aspect 11: The method of any of aspects 1 through 10, further comprising: receiving an indication of one or more analog precoders for a pair of antennas based at least in part on the successive transmissions of the SRS.

Aspect 12: A method for wireless communication at a network entity, comprising: receiving, from a UE, a first message indicating a UE capability to perform antenna-switching using a zero-delay gap period between successive transmissions of a SRS using different antennas of the UE: transmitting a second message indicating a set of SRS parameters for the UE, the set of SRS parameters based at least in part on the UE capability: and receiving the successive transmissions of the SRS using the zero-delay gap period between the successive transmissions of the SRS according to the set of SRS parameters.

Aspect 13: The method of aspect 12, wherein receiving the successive transmissions of the SRS using the zero-delay gap period comprises: receiving the SRS from a pair of antennas of the UE during a first SRS transmission instance according to a first precoder such that a zero-degree phase shift is applied to the SRS at a first antenna and a second antenna of the pair of antennas; and receiving the SRS from the pair of antennas of the UE during a second SRS transmission instance according to a second precoder such that a zero-degree phase shift is applied to the SRS at the first antenna of the pair of antennas and a 180-degree phase shift is applied to the SRS at the second antenna of the pair of antennas.

Aspect 14: The method of aspect 13, further comprising: determining one or more analog precoders for a pair of antennas based at least in part on the SRS received during the first SRS transmission instance and during the second SRS transmission instance: and transmitting an indication of the one or more analog precoders for the pair of antennas to the UE.

Aspect 15: The method of any of aspects 13 through 14, further comprising: determining a precoding matrix for the successive transmissions of the SRS, wherein the set of SRS parameters indicates a precoding matrix comprising the first precoder and the second precoder.

Aspect 16: The method of any of aspects 12 through 15, wherein the set of SRS parameters indicates a first SRS transmission instance and a second SRS transmission instance.

Aspect 17: The method of aspect 16, wherein the first SRS transmission instance and the second SRS transmission instance comprise sub-symbol level time periods or symbol level time periods.

Aspect 18: The method of aspect 17, wherein a modified subcarrier spacing is applied for the successive transmissions of SRS.

Aspect 19: The method of any of aspects 12 through 18, further comprising: transmitting one or more reference signal transmissions, wherein one or more analog precoders for a pair of antennas are selected based at least in part on one or more digital precoders for the pair of antennas and the one or more reference signal transmissions.

Aspect 20: An apparatus for wireless communication at a UE, comprising a processor: memory in electronic communication with the processor: and instructions stored in the memory and executable by the processor to perform a method of any of aspects 1 through 11.

Aspect 21: An apparatus for wireless communication at a UE, comprising at least one means for performing a method of any of aspects 1 through 11.

Aspect 22: A non-transitory computer-readable medium storing code for wireless communication at a UE, the code comprising instructions executable by a processor to perform a method of any of aspects 1 through 11.

Aspect 23: An apparatus for wireless communication at a network entity, comprising a processor: memory in electronic communications with the processor: and instructions stored in the memory and executable by the processor to perform a method of any of aspects 12 through 19.

Aspect 24: An apparatus for wireless communication at a network entity, comprising at least one means for performing a method of any of aspects 12 through 19.

Aspect 25: A non-transitory computer-readable medium storing code for wireless communication at a network entity, the code comprising instructions executable by a processor to perform a method of any of aspects 12 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
   at least one processor; and
   at least one memory coupled with the at least one processor, the at least one memory storing instructions executable by the at least one processor to cause the UE to:

transmit a first message indicating a UE capability to perform antenna-switching using a zero-delay gap period between successive transmissions of a sounding reference signal using different antennas of the UE based at least in part on using one or more phase shifts for the successive transmissions;

receive a second message indicating a set of sounding reference signal parameters for the UE, the set of sounding reference signal parameters based at least in part on the UE capability; and perform, in accordance with the one or more phase shifts, the successive transmissions of the sounding reference signal using the zero-delay gap period between the successive transmissions of the sounding reference signal according to the set of sounding reference signal parameters.

2. The UE of claim 1, wherein the instructions are executable by the at least one processor to perform the successive transmissions of the sounding reference signal using the zero-delay gap period comprise instructions executable by the at least one processor to:

transmit the sounding reference signal from a pair of antennas during a first sounding reference signal transmission instance according to a first precoder such that a zero-degree phase shift of the one or more phase shifts is applied to the sounding reference signal at a first antenna and a second antenna of the pair of antennas; and transmit the sounding reference signal from the pair of antennas during a second sounding reference signal transmission instance according to a second precoder such that the zero-degree phase shift is applied to the sounding reference signal at the first antenna of the pair of antennas and a 180-degree phase shift of the one or more phase shifts is applied to the sounding reference signal at the second antenna of the pair of antennas.

3. The UE of claim 2, wherein a first phase-shifter and a second phase-shifter apply the first precoder during the first sounding reference signal transmission instance and the second precoder during the second sounding reference signal transmission instance.

4. The UE of claim 3, wherein the instructions are further executable by the at least one processor to:

apply a first gain for a first power amplifier of the first antenna performing the sounding reference signal transmission during the first sounding reference signal transmission instance and a second gain for a second power amplifier of the second antenna performing the sounding reference signal transmission during the second sounding reference signal transmission instance.

5. The UE of claim 2, wherein the first antenna and the second antenna of the pair of antennas comprise a co-polarized antenna pair or a cross-polarized antenna pair.

6. The UE of claim 2, wherein the instructions are further executable by the at least one processor to:

identify, based at least in part on the set of sounding reference signal parameters, a precoding matrix comprising the first precoder and the second precoder.

7. The UE of claim 1, wherein the instructions are further executable by the at least one processor to:

identify, based at least in part on the set of sounding reference signal parameters, a first sounding reference signal transmission instance and a second sounding reference signal transmission instance.

8. The UE of claim 7, wherein the first sounding reference signal transmission instance and the second sounding reference signal transmission instance comprise sub-symbol level time periods or symbol level time periods.

9. The UE of claim 8, wherein the instructions are further executable by the at least one processor to:

apply a modified subcarrier spacing for the successive transmissions of sounding reference signal.

10. The UE of claim 1, wherein the instructions are further executable by the at least one processor to:

receive one or more reference signal transmissions; and select one or more analog precoders for a pair of antennas based at least in part on the one or more reference signal transmissions.

11. The UE of claim 1, wherein the instructions are further executable by the at least one processor to:

receive an indication of one or more analog precoders for a pair of antennas based at least in part on the successive transmissions of the sounding reference signal.

12. A network entity, comprising:

at least one processor; and at least one memory coupled with the at least one processor, the at least one memory storing instructions executable by the at least one processor to cause the network entity to:

receive, from a user equipment (UE), a first message indicating a UE capability to perform antenna-switching using a zero-delay gap period between successive transmissions of a sounding reference signal using different antennas of the UE based at least in part on using one or more phase shifts for the successive transmissions;

transmit a second message indicating a set of sounding reference signal parameters for the UE, the set of sounding reference signal parameters based at least in part on the UE capability; and receive, in accordance with the one or more phase shifts, the successive transmissions of the sounding reference signal using the zero-delay gap period between the successive transmissions of the sounding reference signal according to the set of sounding reference signal parameters.

13. The network entity of claim 12, wherein the instructions executable by the at least one processor to perform the successive transmissions of the sounding reference signal using the zero-delay gap period comprise instructions executable by the at least one processor to:

receive the sounding reference signal from a pair of antennas of the UE during a first sounding reference signal transmission instance according to a first precoder such that a zero-degree phase shift is applied to the sounding reference signal at a first antenna and a second antenna of the pair of antennas; and receive the sounding reference signal from the pair of antennas of the UE during a second sounding reference signal transmission instance according to a second precoder such that a zero-degree phase shift is applied to the sounding reference signal at the first antenna of the pair of antennas and a 180-degree phase shift is applied to the sounding reference signal at the second antenna of the pair of antennas.

14. The network entity of claim 13, wherein the instructions are further executable by the at least one processor to:

determine one or more analog precoders for a pair of antennas based at least in part on the sounding reference signal received during the first sounding reference signal transmission instance and during the second sounding reference signal transmission instance; and transmit an indication of the one or more analog precoders for the pair of antennas to the UE.

15. The network entity of claim 13, wherein the instructions are further executable by the at least one processor to:

determine a precoding matrix for the successive transmissions of the sounding reference signal, wherein the set of sounding reference signal parameters indicates a precoding matrix comprising the first precoder and the second precoder.

16. The network entity of claim 12, wherein the set of sounding reference signal parameters indicates a first sounding reference signal transmission instance and a second sounding reference signal transmission instance.

17. The network entity of claim 16, wherein the first sounding reference signal transmission instance and the second sounding reference signal transmission instance comprise sub-symbol level time periods or symbol level time periods.

18. The network entity of claim 17, wherein a modified subcarrier spacing is applied for the successive transmissions of sounding reference signal.

19. The network entity of claim 12, wherein the instructions are further executable by the at least one processor to:

transmit one or more reference signal transmissions, wherein one or more analog precoders for a pair of antennas are selected based at least in part on the one or more reference signal transmissions.

20. A method for wireless communications at a user equipment (UE), comprising:

transmitting a first message indicating a UE capability to perform antenna-switching using a zero-delay gap period between successive transmissions of a sounding reference signal using different antennas of the UE based at least in part on using one or more phase shifts for the successive transmissions;

receiving a second message indicating a set of sounding reference signal parameters for the UE, the set of sounding reference signal parameters based at least in part on the UE capability; and performing, in accordance with the one or more phase shifts, the successive transmissions of the sounding reference signal using the zero-delay gap period between the successive transmissions of the sounding reference signal according to the set of sounding reference signal parameters.

21. The method of claim 20, wherein performing the successive transmissions of the sounding reference signal using the zero-delay gap period comprises:

transmitting the sounding reference signal from a pair of antennas during a first sounding reference signal transmission instance according to a first precoder such that a zero-degree phase shift is applied to the sounding reference signal at a first antenna and a second antenna of the pair of antennas; and transmitting the sounding reference signal from the pair of antennas during a second sounding reference signal transmission instance according to a second precoder such that a zero-degree phase shift is applied to the sounding reference signal at the first antenna of the pair of antennas and a 180-degree phase shift is applied to the sounding reference signal at the second antenna of the pair of antennas.

22. The method of claim 21, wherein a first phase-shifter and a second phase-shifter apply the first precoder during the first sounding reference signal transmission instance and the second precoder during the second sounding reference signal transmission instance.

23. The method of claim 22, further comprising:

applying a first gain for a first power amplifier of the first antenna performing the sounding reference signal transmission during the first sounding reference signal transmission instance and a second gain for a second power amplifier of the second antenna performing the sounding reference signal transmission during the second sounding reference signal transmission instance.

24. The method of claim 21, wherein the first antenna and the second antenna of the pair of antennas comprise a co-polarized antenna pair or a cross-polarized antenna pair.

25. The method of claim 21, further comprising:

identifying, based at least in part on the set of sounding reference signal parameters, a precoding matrix comprising the first precoder and the second precoder.

26. The method of claim 20, further comprising:

identifying, based at least in part on the set of sounding reference signal parameters, a first sounding reference signal transmission instance and a second sounding reference signal transmission instance.

27. The method of claim 26, wherein the first sounding reference signal transmission instance and the second sounding reference signal transmission instance comprise sub-symbol level time periods or symbol level time periods.

28. The method of claim 27, further comprising:

applying a modified subcarrier spacing for the successive transmissions of sounding reference signal.

29. The method of claim 20, further comprising:

receiving one or more reference signal transmissions; and selecting one or more analog precoders for a pair of antennas based at least in part on the one or more reference signal transmissions.

30. A method for wireless communications at a network entity, comprising:

receiving, from a user equipment (UE), a first message indicating a UE capability to perform antenna-switching using a zero-delay gap period between successive transmissions of a sounding reference signal using different antennas of the UE based at least in part on using one or more phase shifts for the successive transmissions;

transmitting a second message indicating a set of sounding reference signal parameters for the UE, the set of sounding reference signal parameters based at least in part on the UE capability; and receiving, in accordance with the one or more phase shifts, the successive transmissions of the sounding reference signal using the zero-delay gap period between the successive transmissions of the sounding reference signal according to the set of sounding reference signal parameters.

* * * * *